US012776236B2

(12) United States Patent
Choi et al.

(10) Patent No.: US 12,776,236 B2
(45) Date of Patent: Oct. 27, 2026

(54) TECHNOLOGY FOR DRIVING A PANEL

(71) Applicant: SILICON WORKS CO., LTD., Daejeon (KR)

(72) Inventors: Jung Min Choi, Daejeon (KR); Hyung Seog Oh, Daejeon (KR); Yong Sung Ahn, Seongnam-si (KR); Ji Hun Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/509,564

(22) Filed: Oct. 25, 2021

(65) Prior Publication Data

US 2022/0044610 A1 Feb. 10, 2022

Related U.S. Application Data

(63) Continuation of application No. 15/579,189, filed as application No. PCT/KR2016/005838 on Jun. 2, 2016, now abandoned.

(30) Foreign Application Priority Data

Jun. 4, 2015 (KR) ........................ 10-2015-0079148
Jun. 9, 2015 (KR) ........................ 10-2015-0081206

(51) Int. Cl.
*G09G 3/20* (2006.01)
*G06F 3/041* (2006.01)
*G06F 3/044* (2006.01)

(52) U.S. Cl.
CPC ............ *G09G 3/20* (2013.01); *G06F 3/0412* (2013.01); *G06F 3/04166* (2019.05);
(Continued)

(58) Field of Classification Search
CPC ..... G09G 3/20; G06F 3/0412; G06F 3/04166; G06F 3/044; G06F 2203/04103;
(Continued)

(56) References Cited

U.S. PATENT DOCUMENTS 9,058,072 B2 6/2015 Bae et al.
9,235,285 B2 1/2016 Hu
(Continued)

FOREIGN PATENT DOCUMENTS

CN 102112951 A 6/2011
CN 103513844 A 1/2014
(Continued)

OTHER PUBLICATIONS

First Office Action, Korean Intellectual Property Office Patent Application No. KR 2015-0079148, Jan. 11, 2022, 11 pages.
(Continued)

*Primary Examiner* — Chanh D Nguyen
*Assistant Examiner* — Jarurat Suteerawongsa
(74) *Attorney, Agent, or Firm* — ROTHWELL, FIGG, ERNST & MANBECK, P.C.

(57) ABSTRACT

The present invention provides a display device that simultaneously conducts display updates and touch sensing in some regions. The display device according to one aspect of the present invention comprises: a plurality of sensor electrodes for sensing approaches or touches of an object; a plurality of display electrodes for forming a data voltage in each pixel in conjunction with the sensor electrodes; a sensor driving circuit for supplying a first sensor electrode with a sensor driving signal; and a data driving circuit for supplying a first display electrode with a data signal which changes in response to the sensor driving signal so that the voltage between the first sensor electrode and the first display electrode becomes a first data voltage.

17 Claims, 26 Drawing Sheets

(52) U.S. Cl.
CPC .... *G06F 3/044* (2013.01); *G06F 2203/04103* (2013.01); *G06F 2203/04108* (2013.01)

(58) Field of Classification Search
CPC ......... G06F 2203/04108; G06F 3/0443; G06F 3/041; G06F 3/04
See application file for complete search history.

(56) References Cited

U.S. PATENT DOCUMENTS

| | | | |
|---|---|---|---|
| 9,285,913 | B1 | 3/2016 | Kang et al. |
| 9,304,620 | B2 | 4/2016 | Han et al. |
| 9,804,711 | B2 | 10/2017 | Noguchi et al. |
| 9,927,937 | B2 | 3/2018 | Noguchi et al. |
| 10,133,437 | B2 | 11/2018 | Noguchi et al. |
| 10,324,579 | B2 | 6/2019 | Noguchi et al. |
| 10,437,375 | B2 | 10/2019 | Fan et al. |
| 10,514,810 | B2 | 12/2019 | Noguchi et al. |
| 2009/0057808 | A1 | 3/2009 | Nakayama |
| 2009/0115750 | A1 | 5/2009 | Chen et al. |
| 2009/0273556 | A1 | 11/2009 | Shimoshikiryoh et al. |
| 2011/0074705 | A1* | 3/2011 | Yousefpor ............. G06F 3/0412 445/24 |
| 2011/0128254 | A1 | 6/2011 | Teranishi et al. |
| 2011/0169747 | A1* | 7/2011 | Chen ..................... G06F 3/0412 345/173 |
| 2011/0216039 | A1 | 9/2011 | Chen et al. |
| 2011/0267293 | A1 | 11/2011 | Noguchi et al. |
| 2011/0267295 | A1 | 11/2011 | Noguchi et al. |
| 2012/0162133 | A1 | 6/2012 | Chen et al. |
| 2013/0314343 | A1* | 11/2013 | Cho ...................... G06F 3/0412 345/173 |
| 2013/0342478 | A1 | 12/2013 | Bae et al. |
| 2014/0168149 | A1 | 6/2014 | Han et al. |
| 2014/0168151 | A1* | 6/2014 | Noguchi ............... G06F 3/0418 345/87 |
| 2014/0333571 | A1 | 11/2014 | Hu |
| 2014/0333582 | A1 | 11/2014 | Huo |
| 2014/0362026 | A1 | 12/2014 | Chen et al. |
| 2015/0022741 | A1 | 1/2015 | Nil et al. |
| 2015/0091850 | A1 | 4/2015 | Morein et al. |
| 2015/0177881 | A1 | 6/2015 | Chen |
| 2015/0254491 | A1* | 9/2015 | Mo ......................... G06F 3/044 345/174 |
| 2015/0378465 | A1* | 12/2015 | Shih .................. G06F 3/041661 345/174 |
| 2016/0004122 | A1 | 1/2016 | Ono et al. |
| 2016/0026312 | A1 | 1/2016 | Park et al. |
| 2016/0094225 | A1 | 3/2016 | Lim et al. |
| 2016/0098114 | A1 | 4/2016 | Pylvas |
| 2016/0195977 | A1 | 7/2016 | Reynolds et al. |
| 2016/0334934 | A1 | 11/2016 | Mo et al. |
| 2016/0370922 | A1 | 12/2016 | Fan et al. |
| 2018/0011570 | A1 | 1/2018 | Noguchi et al. |
| 2018/0120995 | A1 | 5/2018 | Lee et al. |
| 2018/0150159 | A1 | 5/2018 | Noguchi et al. |
| 2019/0050084 | A1 | 2/2019 | Noguchi et al. |
| 2019/0250743 | A1 | 8/2019 | Noguchi et al. |
| 2019/0278404 | A1 | 9/2019 | Ishizkai et al. |

FOREIGN PATENT DOCUMENTS

| | | | |
|---|---|---|---|
| CN | 103698927 | A | 4/2014 |
| CN | 104503632 | B | 1/2018 |
| KR | 10-2011-0120217 | A | 11/2011 |
| KR | 10-2012-0024525 | A | 3/2012 |
| KR | 10-2012-0067250 | A | 6/2012 |
| KR | 10-2012-0106214 | A | 9/2012 |
| KR | 10-2013-0033641 | A | 4/2013 |
| KR | 10-2013-0055525 | A | 5/2013 |
| KR | 10-2013-0143415 | A | 12/2013 |
| KR | 10-2014-0074454 | A | 6/2014 |
| KR | 10-2014-0076841 | A | 6/2014 |
| KR | 10-2014-0134206 | A | 11/2014 |

OTHER PUBLICATIONS

First Office Action, Korean Intellectual Property Office Patent Application No. KR 2015-0081206, Jan. 18, 2022, 11 pages.
International Search Report and Written Opinion, Patent Cooperation Treaty Application No. PCT/KR2016/005838, Sep. 20, 2016, 14 pages.
United States Office Action, U.S. Appl. No. 15/579,189, Jun. 25, 2021, 28 pages.
United States Office Action, U.S. Appl. No. 15/579,189, Dec. 24, 2020, 27 pages.
United States Office Action, U.S. Appl. No. 15/579,189, Aug. 19, 2020, 25 pages.
United States Office Action, U.S. Appl. No. 15/579,189, Feb. 10, 2020, 17 pages.
United States Office Action, U.S. Appl. No. 15/579,189, Oct. 16, 2019, 20 pages.
United States Office Action, U.S. Appl. No. 15/579,189, Apr. 19, 2019, 16 pages.

* cited by examiner

FIG.10

| DL | DL1 | DL2 | ··· | DLN | SUM |
|---|---|---|---|---|---|
| Grayscale | Black ( Gray 255 ) | vHalf ( Gray 127 ) | ··· | White ( Gray 0 ) | Half ( Gray 127) |
| Reverse Noise | −a | −b | ··· | −c | −b |

TECHNOLOGY FOR DRIVING A PANEL

CROSS-REFERENCE TO RELATED APPLICATIONS

This application is a continuation of U.S. patent application Ser. No. 15/579,189 filed on Dec. 1, 2017 which is a national stage application under 35 U.S.C. § 371 of International Application No. PCT/KR2016/005838 filed on Jun. 2, 2016, which claims the benefit of Republic of Korea Patent Application No. 10-2015-0081206 filed on Jun. 9, 2015 and Republic of Korea Patent Application No. 10-2015-0079148 filed on Jun. 4, 2015, each of which is hereby incorporated by reference in its entirety.

TECHNICAL FIELD

The present invention relates to technology for driving a panel.

BACKGROUND ART

Technology for recognizing an object in proximity to or in contact with a touch panel is referred to as touch-sensing technology.

A touch panel is positioned in the same plane as a display panel, and accordingly, users may input a user control signal into the touch panel while viewing an image displayed on the display panel.

This method of generating the user control signal is remarkably intuitive for the user compared to other, previous, user control signal input types, for example, a mouse input type and a keyboard input type.

Due to such advantages, touch-sensing technology is applied to various electronic devices having display panels.

Meanwhile, the touch panel may be completely separated from the display panel depending on the type thereof. For example, an add-on type of touch panel is completely separated from the display panel.

However, the touch panel and the display panel may share some components. For example, a sensor electrode positioned on the touch panel may be used as a common electrode of the display panel. An in-cell type corresponds thereto.

When the in-cell type panel is driven, in the conventional arts, the display device operates only in the display mode during a display interval and only in the touch mode during a touch interval based on interval division.

The conventional method uses a frame time shared by a display interval and a touch interval, and accordingly, a time longer than a predetermined time cannot be allocated to a touch interval.

In general, as the touch interval becomes longer, a Signal-to-Noise Ratio (SNR) increases. In the conventional method, the length of the touch interval is short, so that the SNR is low and touch sensitivity is poor.

When the touch interval is set to be longer in order to solve the problem of touch sensitivity, the display interval becomes shorter and thus the number of circuit components for the display may increase.

Meanwhile, when the touch interval is maintained rather than being increased in order to retain the display interval, the number of sensors should increase to thus improve touch sensitivity.

DETAILED DESCRIPTION OF THE INVENTION

Technical Problem

In this background, an aspect of the present invention is to provide technology for increasing the time for touch driving while maintaining the time for display driving.

Another aspect of the present invention is to provide technology for increasing the time for display driving while maintaining the time for touch driving.

Another aspect of the present invention is to provide technology for increasing both the time for display driving and the time for touch driving.

Another aspect of the present invention is to provide technology for simultaneously performing display driving and touch driving in some or all intervals.

In order to achieve the above-described aspects, in accordance with an aspect of the present invention, a display device for simultaneously performing display update and touch sensing in some intervals is provided.

In accordance with another aspect of the present invention, a display device is provided. The display device includes: a plurality of sensor electrodes configured to sense proximity or the touch of an object; a plurality of display electrodes configured to form a data voltage on each pixel through a link with the sensor electrodes; a sensor-driving circuit configured to supply a sensor-driving signal to a first sensor electrode; and a data-driving circuit configured to supply a data signal, which is changed in accordance with the sensor-driving signal such that the voltage between the first sensor electrode and the first display electrode becomes a first data voltage, to the first display electrode.

In accordance with another aspect of the present invention, a display device is provided. The display device includes: a plurality of sensor electrodes configured to sense proximity or the touch of an object; a plurality of display electrodes configured to form a data voltage on each pixel through a link with the sensor electrodes; a sensor-driving circuit configured to supply a sensor-driving signal to a first sensor electrode; a data-driving circuit configured to supply a data signal to a first display electrode; and a power circuit configured to supply a ground voltage to the data-driving circuit and to change the ground voltage in accordance with the sensor-driving signal.

In accordance with another aspect of the present invention, an apparatus for driving a panel including a plurality of sensor electrodes and a plurality of display electrodes linked with the sensor electrodes is provided. The apparatus includes: a power circuit configured to provide a first ground voltage, a second ground voltage, a first supply voltage linked with the first ground voltage, and a second supply voltage linked with the second ground voltage; a sensor-driving circuit configured to supply a sensor-driving signal to the sensor electrodes; a data-driving circuit configured to generate a data signal based on the second ground voltage and the second supply voltage and to supply the data signal to the display electrodes; and a timing control circuit configured to generate a first timing signal based on the first ground voltage and the first supply voltage and to supply the first timing signal to the data-driving circuit, wherein the power circuit changes the second ground voltage in accordance with the sensor-driving signal, and the data-driving circuit includes an interface circuit configured to convert the first timing signal linked with the first ground voltage into the second timing signal linked with the second ground voltage.

As described above, an aspect of the present invention has the effect of increasing the time for touch driving while maintaining the time for display driving. According to another aspect of the present invention, there is an effect of increasing the time for display driving while maintaining the time for touch driving. According to another aspect of the present invention, there is an effect of increasing both the time for display driving and the time for touch driving. According to another aspect, there is an effect of simultaneously performing display driving and touch driving in some or all intervals.

BRIEF DESCRIPTION OF THE DRAWINGS

FIG. 10 illustrates an example of calculating a signal opposite the sum of noises based on the lookup table;

MODE FOR CARRYING OUT THE INVENTION

Figure 1:
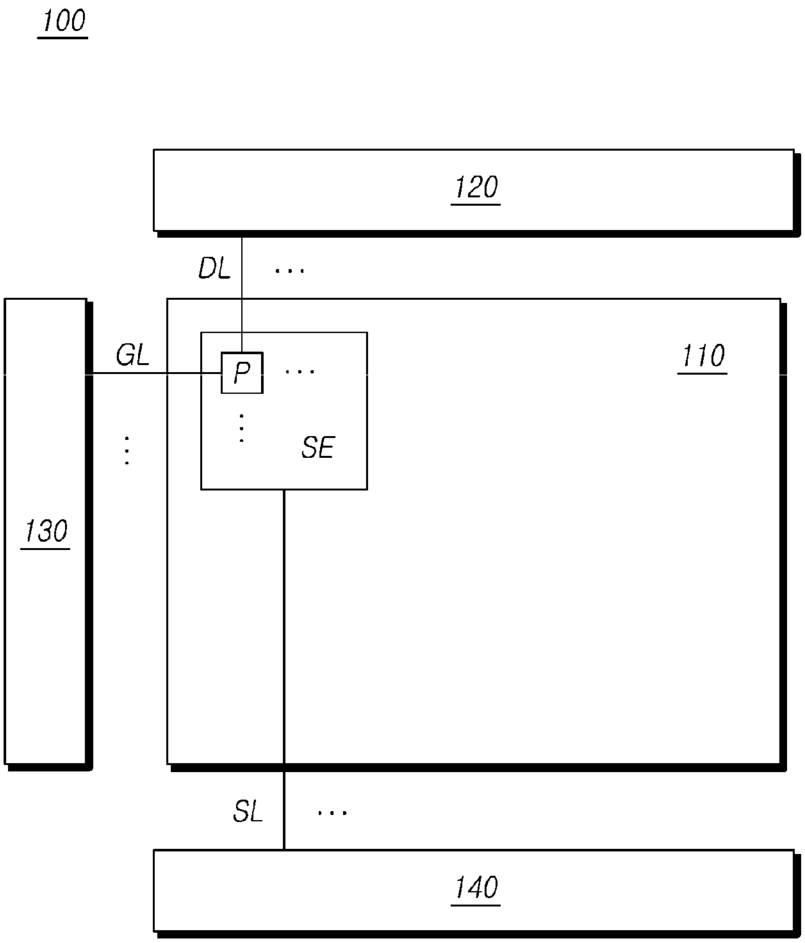
FIG. 1 schematically illustrates a display device to which embodiments can be applied.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 schematically illustrates a display device to which embodiments can be applied.

Referring to FIG. 1, a display device 100 includes a panel 110, a data-driving circuit 120, a gate-driving circuit 130, and a sensor-driving circuit 140.

On the panel 110, a plurality of data lines (DL) connected to the data-driving circuit 120 and a plurality of gate lines (GL) connected to the gate-driving circuit 130 may be formed. Further, on the panel 110, a plurality of pixels (P) corresponding to intersections of the plurality of data lines (DL) and the plurality of gate lines (GL) may be defined.

On each pixel (P), a transistor may be formed, the transistor having a first electrode (for example, a source electrode or a drain electrode) connected to the data line (DL), a gate electrode connected to the gate line (GL), and a second electrode (for example, a drain electrode or a source electrode) connected to a display electrode.

Further, on the panel 110, a plurality of sensor electrodes (SEs) may be further formed so as to be spaced apart from each other. In the area in which the sensor electrode (SE) is located, one pixel (P) or a plurality of pixels (P) may be located.

The panel 110 may include a display panel and a touch panel (Touch Screen Panel: TSP), and the display panel and the touch panel may share some components. For example, the plurality of sensor electrodes (SEs) may be components of the display panel (for example, common electrodes applying the common voltage) and may also be components of the touch panel (for example, sensor electrodes for sensing a touch). The panel 110 may be referred to as an all-in-one panel in that some components are shared between the display panel and the touch panel, but the present invention is not limited thereto. Further, an in-cell type panel is a known form in which some elements are shared between the display panel and the touch panel, but it is only an example of the panel 110, and the panel to which the present invention is applied is not limited to the in-cell type panel.

The data-driving circuit 120 supplies a data signal to a Data Line (DL) in order to display a digital image on each pixel (P) of the panel 110.

The data-driving circuit 120 may include at least one data driver integrated circuit. At least one data driver integrated circuit may be connected to a bonding pad of the panel 110 in a Tape-Automated-Bonding (TAB) manner or a Chip-On-Glass (COG) manner, may be directly arranged on the panel 110, or may be integrated and arranged on the panel 110 depending on the circumstances. Further, the data-driving circuit 120 may be implemented as a Chip-On-Film (COF) type.

The gate-driving circuit 130 sequentially supplies scan signals to the gate lines (GL) in order to turn on or off the transistor located at each pixel (P).

Depending on the driving scheme, the gate driver 130 may be located on only one side of the panel 110 as illustrated in FIG. 1, or may be divided into two parts and may be located on both sides of the panel 110.

Further, the gate-driving circuit 130 may include at least one gate driver integrated circuit. At least one gate driver integrated circuit may be connected to a bonding pad of the panel 110 in a Tape-Automated-Bonding (TAB) manner or a Chip-On-Glass (COG) manner, may be directly arranged on the panel 110 in a Gate-In-Panel (GIP) manner, or may be integrated and arranged on the panel 110 depending on the circumstances. In addition, the gate-driving circuit 130 may be implemented as a Chip-On-Film (COF) type.

The sensor-driving circuit 140 supplies sensor-driving signals to all or some of the plurality of sensor electrodes (SE) connected to the sensing lines (SL).

As illustrated in FIG. 1, the sensor-driving circuit 140 may be located outside the data-driving circuit 120 and the gate-driving circuit 130 as an element separate from the data-driving circuit 120 and the gate-driving circuit 130. However, depending on the implemented scheme, the sensor-driving circuit 140 may be implemented as an internal element of a separate driver integrated circuit including at least one of the data-driving circuit 120 and the gate-driving circuit 130 or as an internal element of the data-driving circuit 120 or the gate-driving circuit 130.

Accordingly, application of the sensor-driving signals to all or some of the plurality of sensor electrodes (SE) by the sensor-driving circuit 140 may be considered as application of the sensor-driving signals to all or some of the plurality of sensor electrodes (SE) by the separate driver integrated circuit including the sensor-driving circuit 140. Further, depending on a designed scheme, the data-driving circuit 120 or the gate-driving circuit 130 including the sensor-driving circuit 140 may apply sensor-driving signals to all or some of the plurality of sensor electrodes (SE).

The sensor-driving circuit 140 is not limited to the above-described implementation and design schemes, and may be some other element, or may be an element located inside or outside the other element if it has the same or similar function to be performed.

Further, although FIG. 1 illustrates that one sensor-driving circuit 140 is located in the display device 100, the display device 100 may include two or more sensor-driving circuits 140.

Meanwhile, in order to supply the sensor-driving signals to all or some of the plurality of sensor electrodes (SE) by the sensor-driving circuit 140, a Sensing Line (SL) connected to each of the plurality of sensor electrodes (SE) is required. Accordingly, the sensing line (SL) connected to each of the plurality of sensor electrodes (SE) to transmit the sensor-driving signals may be formed in a first direction (for example, a vertical direction) or a second direction (for example, a horizontal direction) on the panel 110.

Meanwhile, the display device 100 may adopt a capacitive touch type of recognizing proximity or the touch of an object by sensing a change in capacitance through the sensor electrodes (SE).

The capacitive touch type may be divided into, for example, a mutual capacitive touch type and a self-capacitive touch type.

In the mutual capacitive touch type, which is one of available capacitive touch types, a sensor-driving signal is applied to one sensor electrode (Tx electrode), and the other sensor electrode (Rx electrode) coupled to the Tx electrode is sensed. In the mutual capacitive touch type, a value sensed in the Rx electrode may vary depending on the proximity or touch of the object, such as a finger or a pen, and the presence or absence of the touch and touch coordinates are detected using the value sensed in the Rx electrode.

In the self-capacitive touch type, which is one of available capacitive touch types, a sensor-driving signal is applied to one sensor electrode (SE) and then the corresponding one sensor electrode (SE) is sensed again. In the self-capacitive touch type, the value sensed in the corresponding one sensor electrode (SE) may vary depending on the proximity or touch of the object, such as a finger or a pen, and the presence or absence of the touch and touch coordinates are detected using the sensing value. In the self-capacitive touch type, the sensor electrode (SE) for applying the sensor-driving signal and the sensed sensor electrode (SE) are the same as each other, so that there is no distinction between the TX electrode and the RX electrode.

The display device 100 may adopt one of the above-described two capacitive touch types (mutual capacitive touch type and self-capacitive touch type). However, this specification describes an embodiment based on the assumption that the self-capacitive touch type is adopted for convenience of description.

Meanwhile, the display device 100 may drive the sensor electrodes (SE) without dividing a display section from a touch section. For example, the display device 100 may apply sensor-driving signals to all or some of the sensor electrodes (SE) in a section in which data signals are supplied.

First Embodiment (Embodiment of IP2015 309)

Figure 2A:
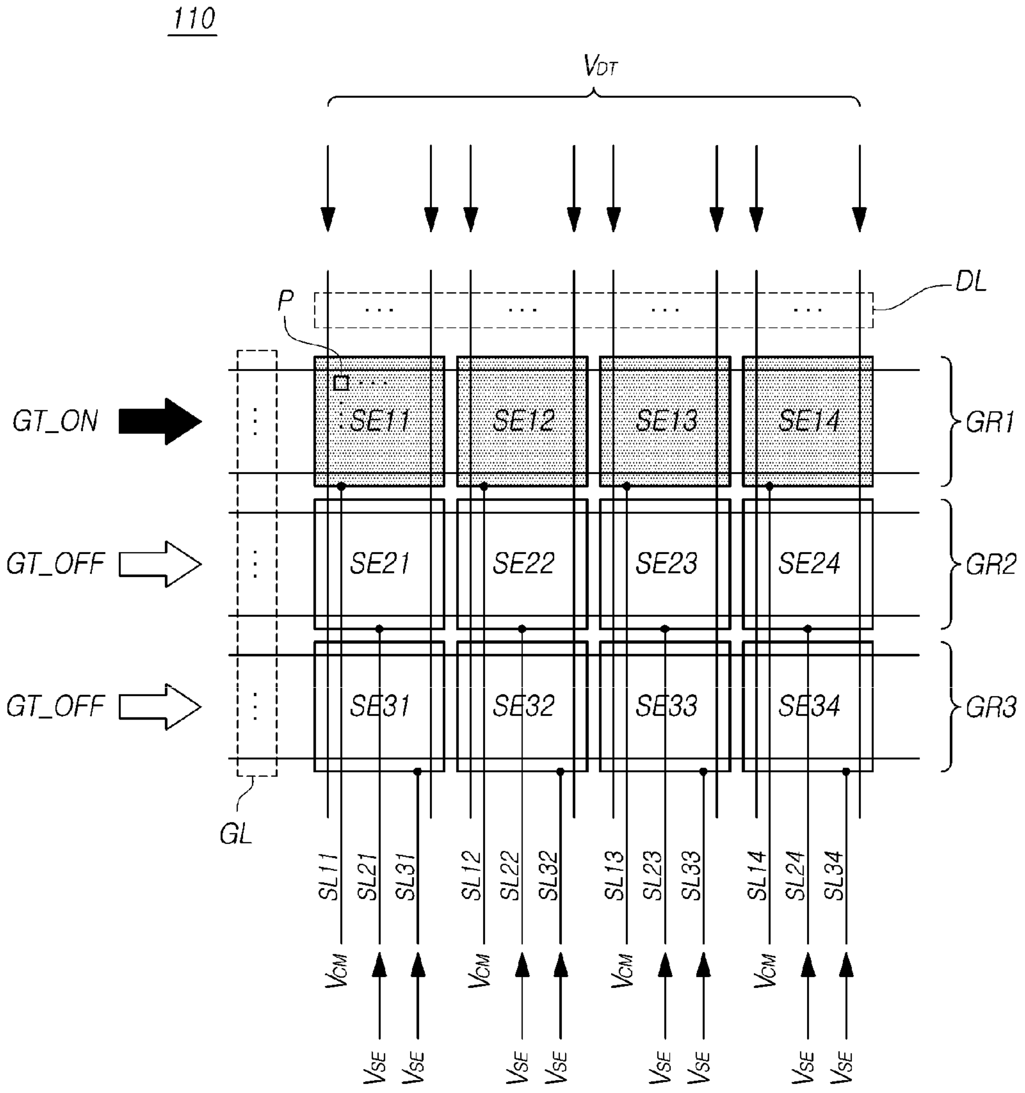
FIGS. 2A to 2C illustrate signals supplied to a panel in the same interval according to a first embodiment.
Figure 2B:
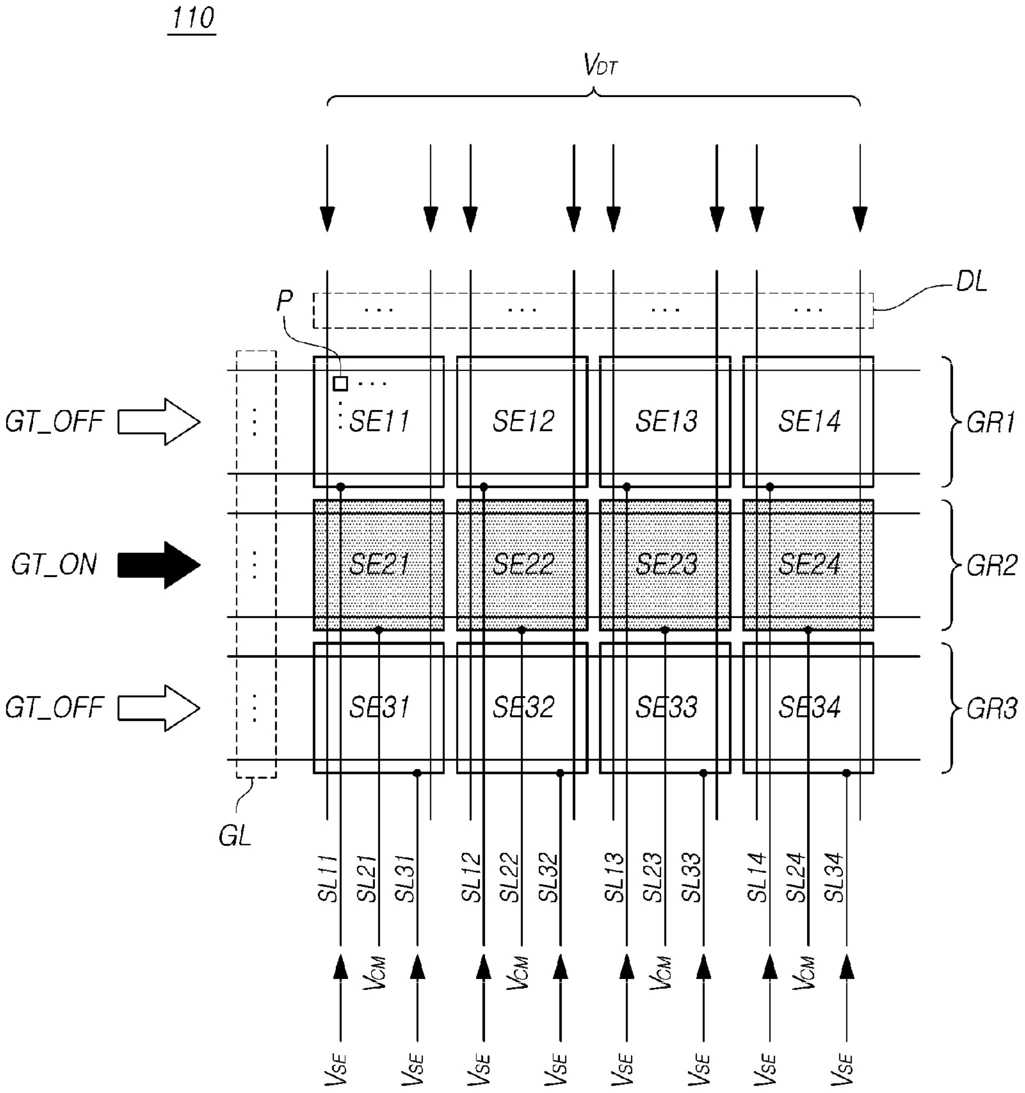
Figure 2C:
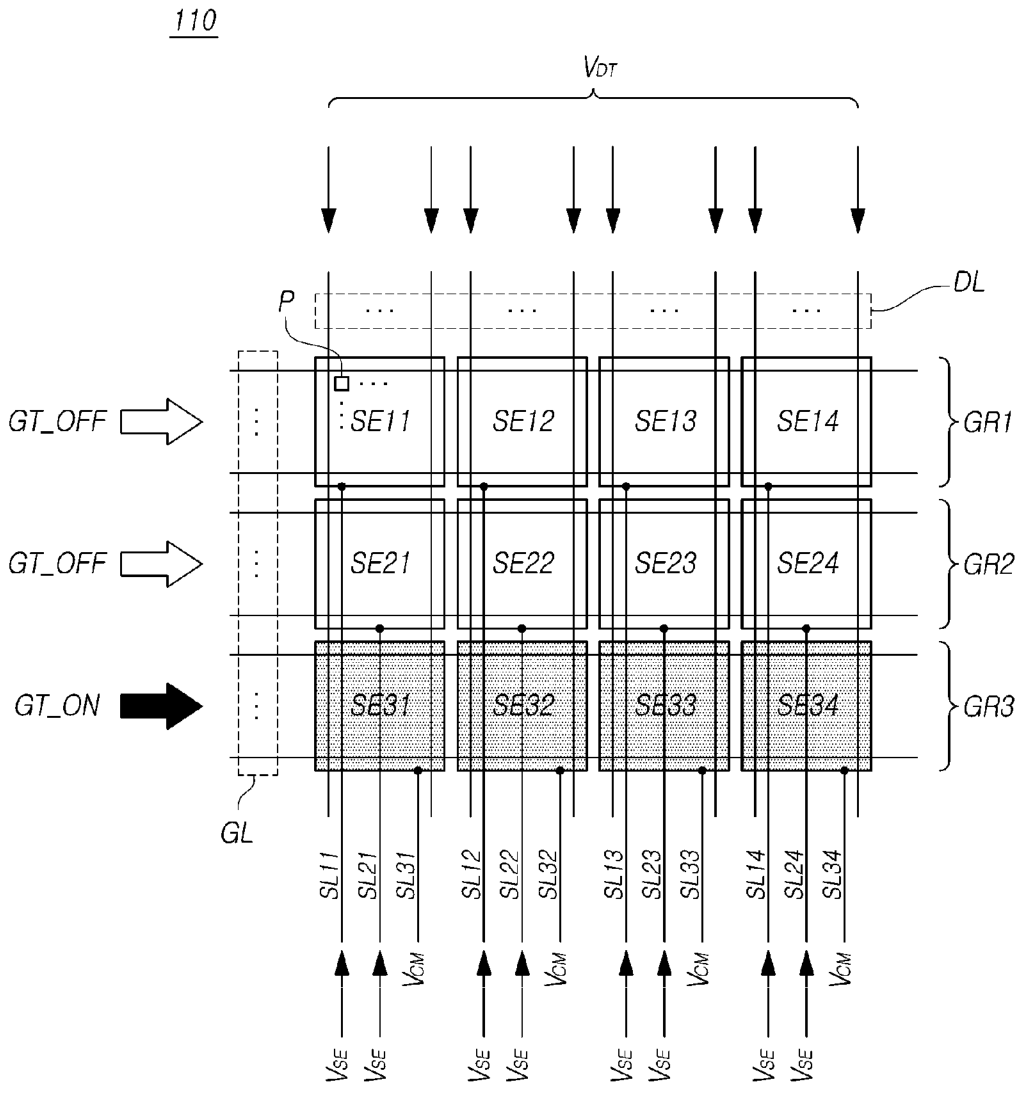

FIGS. 2A to 2C illustrate signals supplied to a panel in the same interval according to a first embodiment.

FIG. 2A illustrates signals supplied to the panel 110 in a TIME A section, FIG. 2B illustrates signals supplied to the panel 110 in a TIME B section, and FIG. 2C illustrates signals supplied to the panel 110 in a TIME C section.

Referring to FIG. 2A, in the TIME A section, a scan signal (GT_ON) for turning on the transistor is supplied to gate lines (GL) connected to pixels (P) of a first group (GR1) of the panel 110. Further, scan signals (GT_OFF) for turning off the transistor are supplied to gate lines (GL) connected to pixels (P) of a second group (GR2) and a third group (GR3) of the panel 110. The turning on or off of the transistor may be determined by a voltage between a gate electrode of the transistor and a source electrode or a drain electrode, and the turn-on scan signal (GT_ON) and the turn-off scan signal (GT_OFF) may have a varying voltage value, rather than remaining at a single voltage. For example, in the state in which a predetermined difference is maintained between a common voltage corresponding to a base voltage of the transistor and a voltage of the gate electrode, if the common voltage is periodically changed, the scan signal (GT_ON or GT_OFF) may also be periodically changed.

According to the turn-on scan signal (GT_ON), transistors connected to the pixels (P) of the first group (GR1) are turned on and display electrodes located on the pixels (P) of the first group (GR1) are connected to data lines (DL). According to the turn-off scan signal (GT_OFF), transistors connected to the pixels (P) of the second group (GR2) and the third group (GR3) are turned off and display electrodes located on the pixels (P) of the second group (GR2) and the third group (GR3) are not connected to the data lines (DL).

At this time, data signals (VDT) are supplied to the data lines (DL), but only the display electrodes of the pixels (P) of the first group (GR1) are connected to the data lines (DL), so that the data signals (VDT) are supplied only to the display electrodes of the pixels (P) of the first group (GR1). Here, the turn-on scan signal (GT_ON) may be sequentially supplied to respective lines, and thus the display electrodes of the pixels (P) of the first group (GR1) may sequentially receive the data signals (VDT) for the respective lines.

When the data signals (VDT) are supplied to the display electrodes, the corresponding pixels (P) update a display. For example, in the case of a pixel (P) for which a grayscale value is changed according to the data signal (VDT), if the data signal (VDT) is supplied to the display electrode, the grayscale value of the pixel (P) is updated according to the corresponding data signal (VDT).

In FIG. 2A, since the data signals (VDT) are supplied only to the display electrodes of the pixels (P) of the first group (GR1), only the display of the pixels (P) of the first group (GR1) is updated.

Referring to FIG. 2A again, in a section in which the data signals (VDT) are supplied to the panel 110, sensor-driving signals (VSE) are supplied to some sensor electrodes (SE21 to SE24 and SE31 to SE34). More specifically, sensor-driving signals (VSE) are applied to the sensor electrodes (SE21 to SE 24 and SE31 to SE34) belonging to the second group (GR2) and the third group (GR3).

The display electrodes located on the pixels (P) may form a data voltage through a link with common electrodes and update the display of each pixel (P) based on the data voltage. For example, when the display device 100 is a liquid crystal display device, the display device 100 may form the data voltage through the data signal (VDT) supplied to the display electrode and the common voltage (VCM) supplied to the common electrode, and may control the grayscale value by controlling the liquid crystal direction according to the data voltage so as to update the display.

The sensor electrodes SE21 to SE24 and SE31 to SE34 may function as the common electrodes. In FIG. 2A, the data signals (VDT) are supplied to the display electrodes of the pixels (P) of the first group (GR1), and the common voltage (VCM) corresponding to the data signals (VDT) is supplied to the sensor electrodes (SE11 to SE14) belonging to the first group (GR1).

Referring to FIG. 2B, in the TIME B section, a scan signal (GT_ON) for turning on the transistor is supplied to gate lines (GL) connected to pixels (P) of a second group (GR2) of the panel 110. Further, scan signals (GT_OFF) for turning off the transistor are supplied to gate lines (GL) connected to pixels (P) of a third group (GR3) and a first group (GR1) of the panel 110.

Data signals (VDT) are supplied to data lines (DL). At this time, since the turn-on signal (GT_ON) is supplied only to the gate lines (GL) connected to the pixels (P) of the second group (GR2), only display electrodes of the pixels (P) of the second group (GR2) receive the data signals (VDT).

The common voltage (VCM) is supplied to sensor electrodes (SE21 to SE24) belonging to the second group (GR2), and thus the display of the pixels (P) of the second group (GR2) is updated. Further, the sensor-driving signal (VSE) is applied to sensor electrodes (SE31 to SE34 and SE11 to SE14) belonging to the third group (GR3) and the first group (GR1), and thus the touch made at the corresponding locations may be recognized.

Referring to FIG. 2C, in the TIME C section, a scan signal (GT_ON) for turning on the transistor is supplied to gate lines (GL) connected to pixels (P) of a third group (GR3) of the panel 110. Further, scan signals (GT_OFF) for turning off the transistor are supplied to gate lines (GL) connected to pixels (P) of a first group (GR1) and a second group (GR2) of the panel 110.

Data signals (VDT) are supplied to data lines (DL). At this time, since the turn-on signal (GT_ON) is supplied only to the gate lines (GL) connected to the pixels (P) of the third group (GR3), only display electrodes of the pixels (P) of the third group (GR3) receive the data signals (VDT).

The common voltage (VCM) is supplied to sensor electrodes (SE31 to SE34) belonging to the third group (GR3), and thus the display of the pixels (P) of the third group (GR3) is updated. The sensor-driving signal (VSE) is applied to sensor electrodes (SE11 to SE14 and SE21 to SE24) belonging to the first group (GR1) and the second group (GR2), and thus the touch made at the corresponding locations may be recognized.

Figure 3:
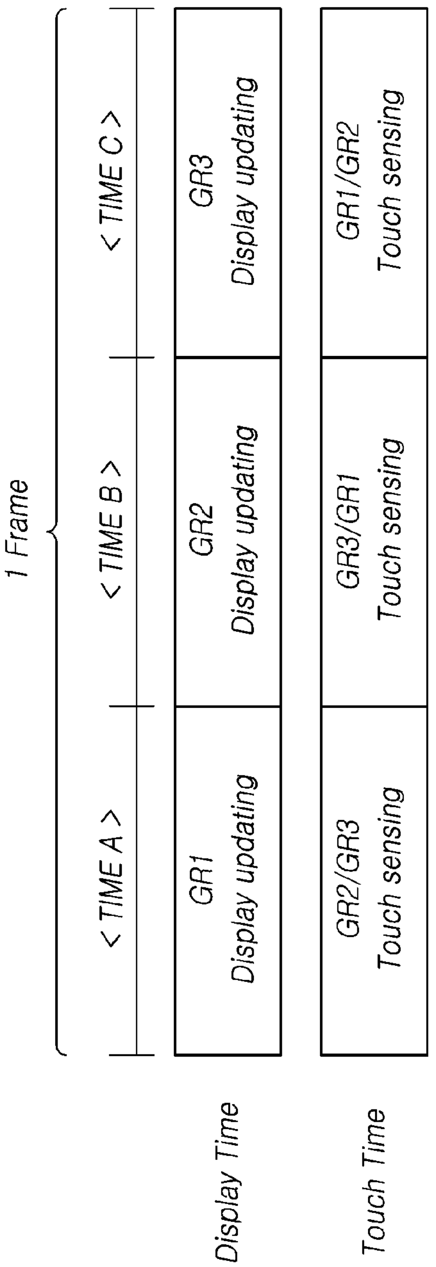
FIG. 3 illustrates a display interval and a touch interval in respective intervals of FIGS. 2A to 2C.

FIG. 3 illustrates a display section and a touch section in respective sections of FIGS. 2A to 2C.

Referring to FIGS. 2A to 2C and FIG. 3, when the display of the pixels (P) of the first group (GR1) in the TIME A section and the display of the pixels (P) of the second group (GR2) is updated in the TIME B section, the display of the pixels (P) of the third group (GR3) is updated in the TIME C section. Accordingly, all of the one frame is used as the time for updating the display.

In the touch interval, when the touch in the second group (GR2) and the third group (GR3) is sensed in the TIME A section and the touch in the third group (GR3) and the first group (GR1) is sensed in the TIME B section, the touch in the first group (GR1) and the second group (GR2) is sensed in the TIME C section. Accordingly, all of the one frame may be used as the time for sensing the touch.

Figure 4:
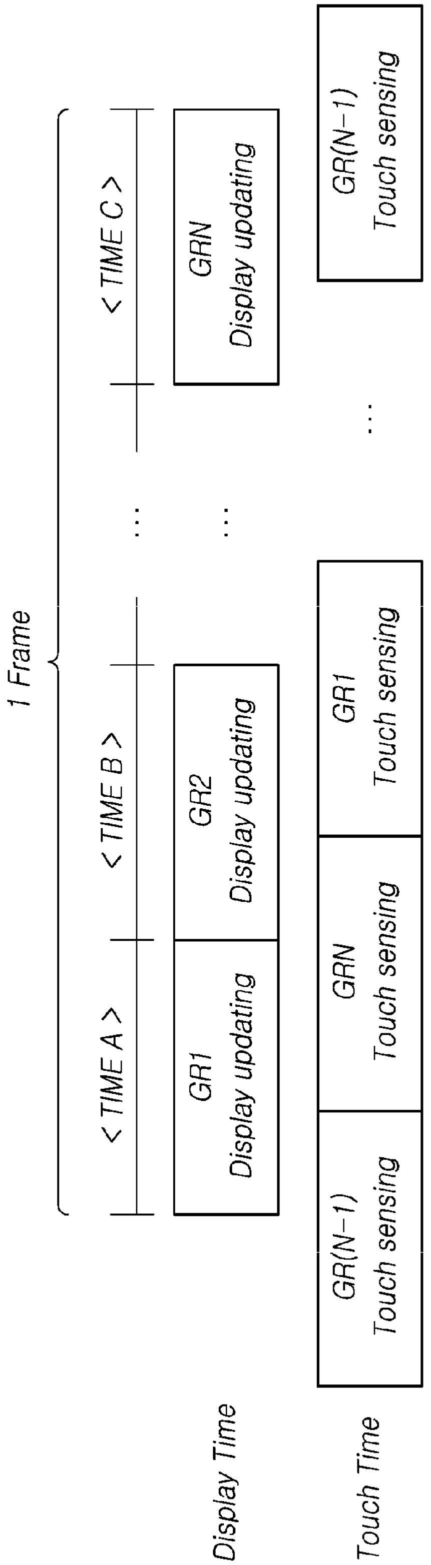
FIG. 4 illustrates an example of expansion of FIG. 3.

FIG. 4 illustrates an example of expansion of FIG. 3.

Referring to FIG. 4, N (N is a natural number greater than or equal to 3) groups (GR1, GR2, . . . , GRN) may exist in the display device 100. In N divided sections (TIME A, B, . . . , N), each of the display of the pixels (P) belonging to the N groups (GR1, GR2, . . . , GRN) may be updated.

In each section, the touch for at least one of the remaining groups, except for the group in which the display is updated, may be sensed. For example, the touch for at least one of the remaining groups, except for the first group (GR1), in which the display is updated, may be sensed in the TIME A section. Referring to FIG. 4, in the TIME A section, the touch for the N−1th group (GR(N−1)) and the Nth group (GRN) are sensed in the TIME A section.

As illustrated in FIG. 4, it is not necessary for the section for updating the display and the section for sensing the touch to be the same as each other. Referring to FIG. 4, the section (TIME A) for updating the pixels (P) of the first group (GR1) partially overlaps the section for sensing the touch for the N−1th group (GR(N−1)), but the two sections are not completely the same.

As a result, the display device 100 may separately perform the display update and the touch sensing without synchronizing them. However, the display device 100 includes at least one sub-section for simultaneously performing the display update and the touch sensing in order to increase the section for updating the display and the section for sensing the touch within a predetermined time. Although the examples of FIGS. 3 and 4 illustrate that the display update and the touch sensing are simultaneously performed in all sections, the display update and the touch sensing may be simultaneously performed only in some sub-sections, and may be separately performed in the remaining sub-sections according to some embodiments.

Meanwhile, when the display update and the touch sensing are simultaneously performed, a signal (for example, a data signal) for updating the display may influence the touch sensing. The influence is attributable to mutual coupling between a line (for example, a data line) for supplying the signal for the display update and an electrode (for example, a sensor electrode) for the touch sensing.

Figure 5:
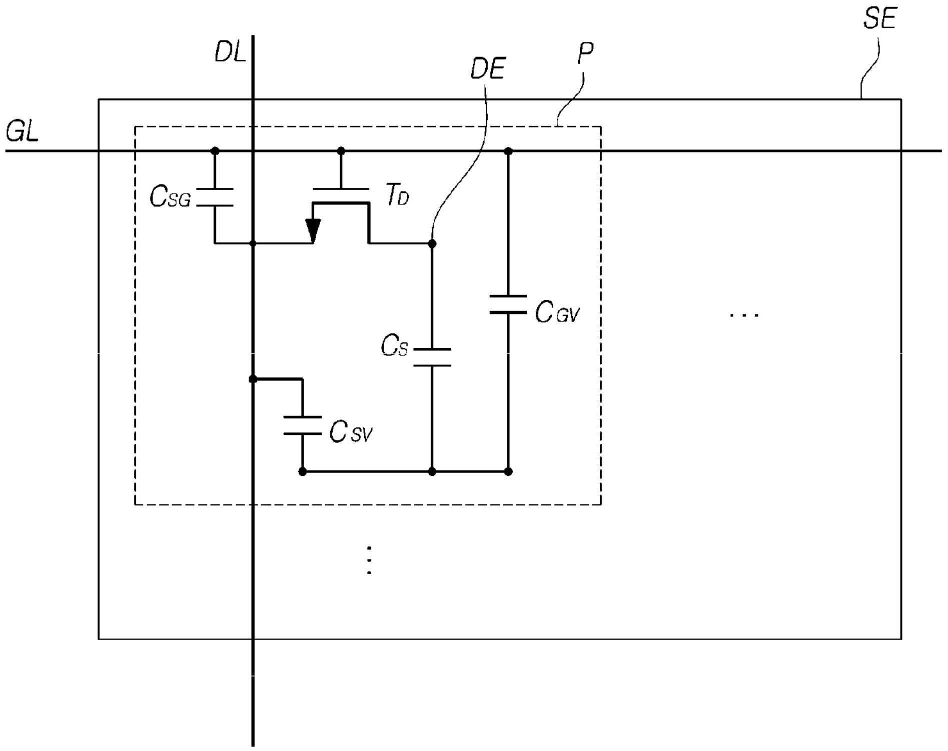
FIG. 5 illustrates a capacitive coupling relationship on a sensor electrode and a pixel.

FIG. 5 illustrates a capacitive coupling relation in the sensor electrode and the pixel.

Referring to FIG. 5, in an area in which the sensor electrode (SE) is located, at least one pixel (P) is located.

On the pixel (P), a transistor (TD) is located, a gate line (GL) connected to a gate line of the transistor (TD) is located, and a data line (DL) connected to a first electrode of the transistor (TD) is located. Further, on the pixel (P), a display electrode (DE) for receiving a data signal is located, and the display electrode (DE) is connected to a second electrode of the transistor (TD).

A plurality of lines (for example, the gate lines and the data lines) located on the pixel (P) and the sensor electrode (SE) and the electrodes (for example, the display electrodes and the sensor electrodes) may be mutually coupled by capacitance.

Referring to FIG. 5, the gate line (GL) and the data line (DL) are coupled by capacitance CSG, and the data line (DL) and the sensor electrode (SE) are coupled by capacitance CSV. Further, the display electrode (DE) and the sensor electrode (SE) are coupled by capacitance CS, and the gate line (GL) and the sensor electrode (SE) are coupled by capacitance CGV.

Due to the capacitive coupling, the signal (for example, the data signal) for updating the display may influence the touch sensing.

Figure 6:
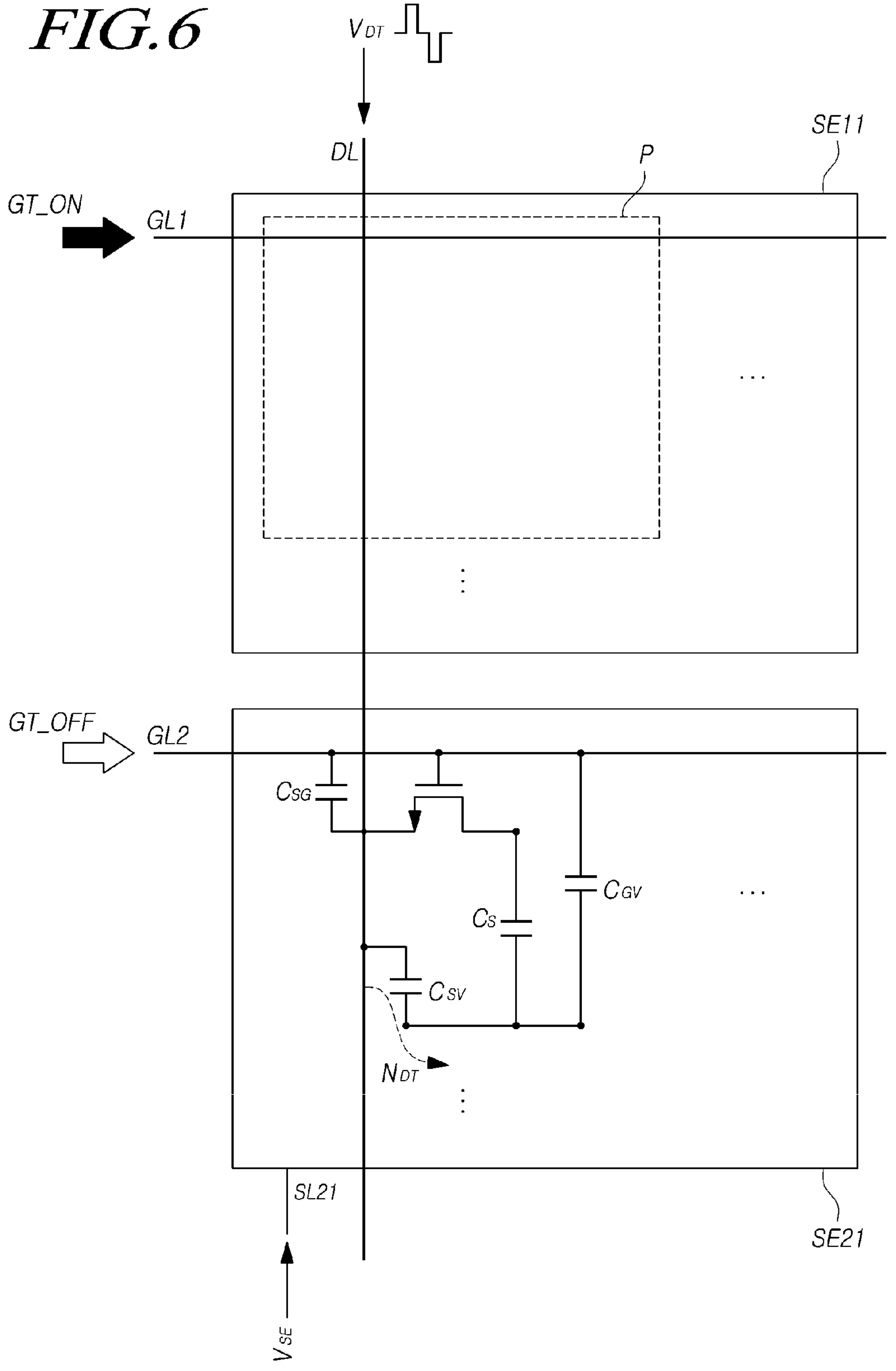
FIG. 6 illustrates inflow of a signal for updating a display to sensor electrodes through capacitance CSV.

FIG. 6 illustrates inflow of the signal for updating the display to the sensor electrodes through capacitance CSV. Further, FIG. 6 schematically illustrates expanded parts SE11 and SE21 of FIG. 2A for convenience of description.

Referring to FIG. 6, the turn-on scan signal (GT_ON) is supplied to a first gate line (GL1) connected to the pixel (P) located on a first sensor electrode (SE11) in order to update the display for the pixel (P) located on the first sensor electrode (SE11). Further, the data signal (VDT) is supplied to the data line (DL) according to the turn-on scan signal (GT_ON), and thus the display for the pixel (P) located on the first sensor electrode (SE11) is updated.

In order to simultaneously perform the display update and the touch sensing, the turn-off scan signal (GT_OFF) is supplied to a second gate line (GL2) located on a second sensor electrode (SE21) when the turn-on scan signal (GT_ON) is supplied to the first gate line (GL1). Further, the sensor-driving signal (VSE) is supplied to a sensing line (SL21) connected to the second sensor electrode (SE21).

Meanwhile, a plurality of capacitances CSG, CSV, CS, and CGV corresponding to the second sensor electrode (SE21) is formed by the gate line (GL2) and the data line (DL) located on the second sensor electrode (SE21), and a display update signal may flow in due to the capacitance.

For example, the data line (DL) for supplying the data signal (VDT) may be located both on the first sensor electrode (SE11) for updating the display and the second sensor electrode (SE21) for sensing the touch. Accordingly, the data signal (VDT) supplied to the data line (DL) may flow into the second sensor electrode (SE21) as noise (NDT) through the capacitance CSV coupled with the second sensor electrode (SE21).

Embodiment 1-1 for Removing Noise

Figure 7:
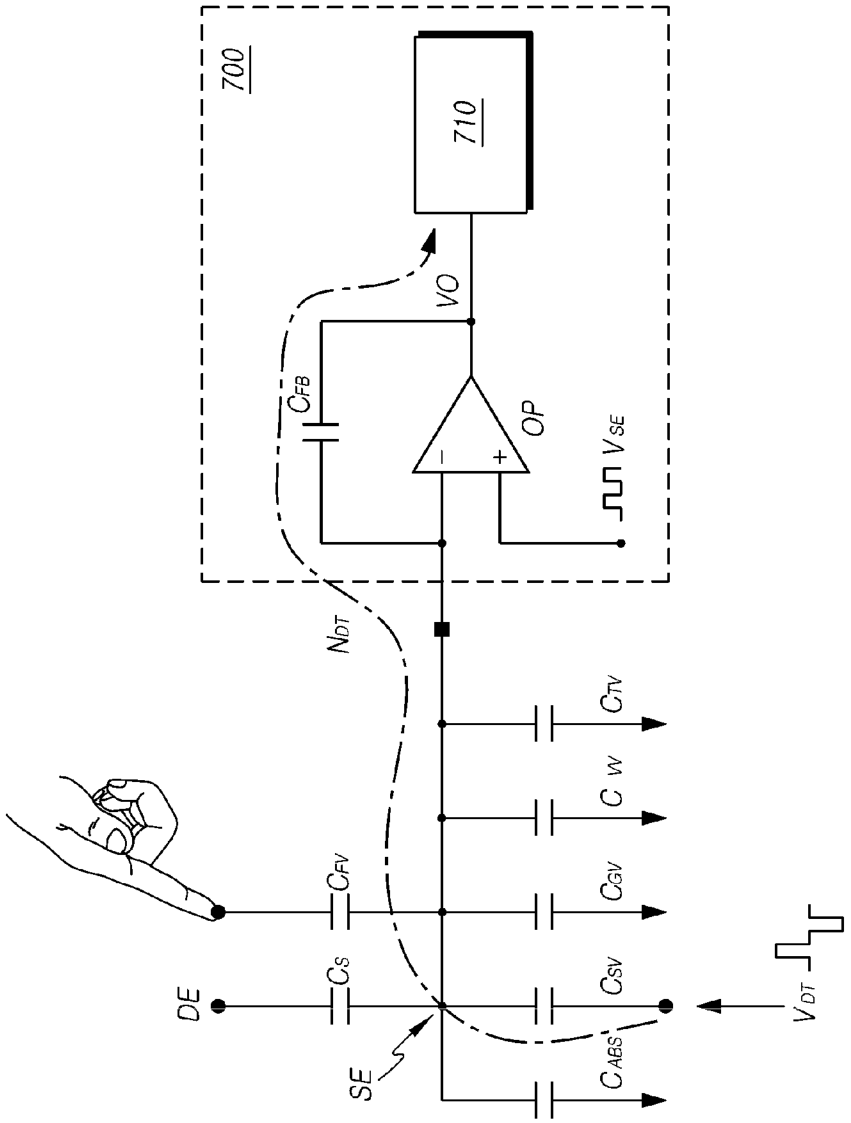
FIG. 7 illustrates capacitance coupled with a sensor electrode and a schematic circuit model of a sensing circuit.

FIG. 7 illustrates capacitance coupled with a sensor electrode and a schematic circuit model of a sensing circuit.

Referring to FIG. 7, on the sensor electrode (SE), capacitance CABS between the sensor electrode (SE) and the ground connection, capacitance CVV between the sensor electrode (SE) and another sensor electrode, and capacitance CTV between the sensor electrode (SE) and the sensing line may further exist in addition to the capacitance CSV, CGV, and CS illustrated in FIG. 5. Further, capacitance CFV generated when an object (a finger in FIG. 7) is in proximity to or in contact with the sensor electrode (SE) is also illustrated in FIG. 7.

The display device 100 may further include a sensing circuit 700 to sense the touch on the sensor electrode (SE), and the sensing circuit 700 may recognize the proximity or the touch of the object by sensing a change in capacitance around the sensor electrode (SE) generated by the proximity or the touch of the object on the sensor electrode (SE).

As illustrated in FIG. 7, in order to sense the change in capacitance, the sensing circuit 700 may include an OP Amp (OP), and may connect a first input terminal of the OP Amp ((−) terminal of the OP) to the sensor electrode (SE) and input the sensor-driving signal (VSE) to a second input terminal ((+) terminal of the OP). Further, feedback capacitance (CFB) may be located between an output terminal of the OP Amp (OP) and the first input terminal ((−) terminal of the OP).

In the sensing circuit 700, the change in capacitance generated on the sensor electrode (SE) may be transmitted to the feedback capacitance (CFB) through an electrical signal (for example, current, charge, or voltage) and the OP Amp (OP) may output a voltage (VO) of the feedback capacitance (CFB).

In such a touch sensing process, the noise (NDT) in the data signal (VDT), described with reference to FIG. 6, may be transmitted as the output (VO) through capacitance CSV.

In order to prevent incorrect recognition of the touch by the noise (NDT), the sensing circuit 700 may further include a noise removal block 710.

Figure 8:
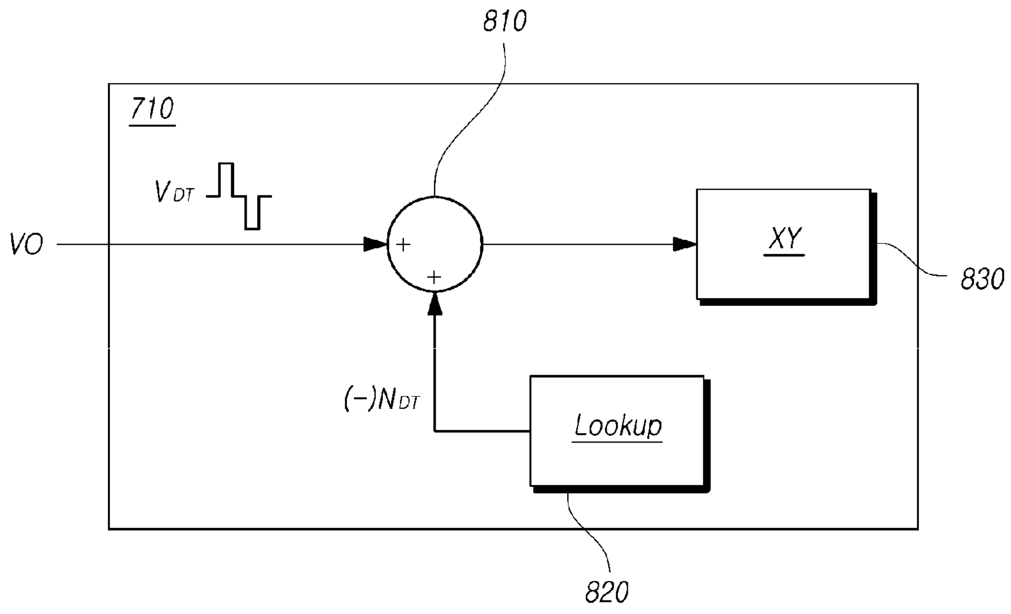
FIG. 8 schematically illustrates the configuration of a noise removal block of FIG. 7.

FIG. 8 schematically illustrates the configuration of the noise removal block of FIG. 7.

Referring to FIG. 8, the noise removal block 710 may generate a signal that is the opposite ((−)NDT) of the noise (NDT) by the data signal (VDT) and may remove the noise (NDT) by the data signal (VDT) by adding the opposite signal ((−)NDT) to the output (VO) of the OP Amp (OP of FIG. 6).

The display device 100 may detect the size of the data signal (VDT). For example, since the data-driving circuit 120 generates the data signal (VDT), the display device 100 may detect the size of the data signal (VDT). Further, the size of the data signal (VDT) is determined according to image data transmitted from a host (not shown), so that the display device 100 may detect the size of the data signal (VDT) based on the image data.

Information on the size of the detected data signal (VDT) may be transmitted to the noise removal block 710. Further, the noise removal block 710 may generate the signal opposite the noise signal ((−)NDT) according to the size of the data signal (VDT). For example, the noise (NDT) may be reduced from the data signal (VDT) by a predetermined percentage according to the characteristic of capacitance CSV. Accordingly, the noise removal block 710 may generate a signal, which has the size corresponding to a predetermined percentage of the data signal (VDT) and has a polarity opposite thereto, as the signal opposite the noise signal ((−) NDT).

Further, the noise removal block 710 may generate the signal opposite the noise signal ((−)NDT) using a lookup table 820. As described above, the data signal (VDT) is generated based on the image data transmitted from the host (not shown), and the image data may contain a grayscale value corresponding to the data signal (VDT). The noise removal block 710 may store in advance the size of the signal opposite the noise signal ((−)NDT) for each piece of image data in the lookup table 820 and apply the image data corresponding to the data signal (VDT) to the lookup table 820 to determine a characteristic (for example, phase or size) of the signal opposite the noise signal ((−)NDT) and generate the signal opposite the noise signal ((−)NDT) according to the determined characteristic.

Structurally, the noise removal block 710 may include an adder 810, the lookup table 820, and a coordinate generator 830. Here, the adder 810 is a device for adding the output (VO) of the OP Amp (OP) and the signal opposite the noise signal ((−)NDT), and the lookup table 820 is a device for generating the signal opposite the noise signal ((−)NDT) according to the image data corresponding to the data signal (VDT). The adder 810 may transmit a signal, from which the noise (NDT) is removed, to the coordinate generator 830, and the coordinate generator 2230 may generate touch information, such as touch coordinates, based on the signal. The coordinate generator 830 may be implemented outside the noise removal block 710 according to some embodiments.

Processing by the noise removal block 710 may be performed digitally. For example, the output (VO) transmitted to the noise removal block 710 may be a digital value, and the noise removal block 710 may remove the noise (NDT) through digital calculation. Further, the noise removal block 710 may further include an analog-to-digital converter (not shown), and may remove the noise (NDT) after converting the output (VO) into a digital value through the analog-to-digital converter (not shown).

Meanwhile, a plurality of data lines (DL) may be located on one sensor electrode, and different data signals (VDT) may be supplied to the plurality of data lines (DL). Accordingly, the noise removal block 710 may collectively calculate the data signals (VDT) flowing from the plurality of data lines (DL) and generate the signal opposite the noise signal ((−)NDT).

Figure 9:
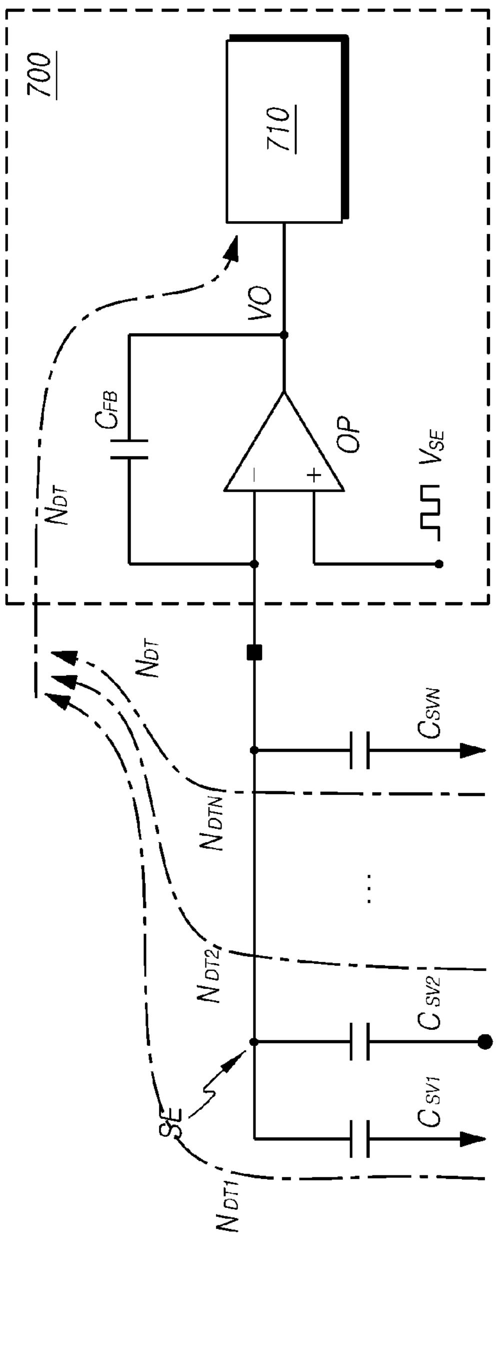
FIG. 9 illustrates capacitance coupled with a plurality of data lines and a schematic circuit model of a sensing circuit.

FIG. 9 illustrates capacitance coupled with a plurality of data lines and a schematic circuit model of a sensing circuit.

Referring to FIG. 9, capacitances (CSV1, CSV2, . . . , CSVN) coupled with a plurality of data lines may be formed on a sensing electrode (SE), and different noises (NDT1, NDT2, . . . , NDTN) may flow in through the respective capacitances (CSV1, CSV2, . . . , CSVN).

The noise removal block 710 may individually or collectively compensate for the different noises (NDT1, NDT2, . . . , NDTN) flowing in through the respective capacitances (CSV1, CSV2, . . . , CSVN).

In the individual compensation method, a signal opposite the noise signal is generated for each noise (NDT1, NDT2, . . . , NDTN). To this end, the noise removal block 710 may include N devices for generating signals opposite the noise.

Meanwhile, the noise removal block 710 may collectively compensate for the noises (NDT1, NDT2, . . . , NDTN). For example, the noise removal block 710 may calculate the sum of the noises (NDT1, NDT2, . . . , NDTN), generate a signal opposite the sum of noises, and remove the noise.

The noise removal block 710 may generate the signal opposite the sum of noises through the lookup table 820 illustrated in FIG. 8.

FIG. 10 illustrates an example of calculating the signal opposite the sum of noises based on the lookup table.

The noise removal block 710 may acquire image data (grayscale in FIG. 10) for each data line (DL1, DL2, . . . , DLN) coupled with the sensor electrode and calculate the signal opposite the noise signal (reverse noise in FIG. 10) for each data line (DL1, DL2, . . . , DLN) based on the lookup table 820.

At this time, the noise removal block 710 may sum up the signals opposite the noise signals (reverse noise in FIG. 10) calculated for each data line (DL1, DL2, . . . , DLN) and calculate the signal opposite the sum of noises.

In another method, the noise removal block 710 may sum up image data (grayscale in FIG. 10) acquired for each data line (DL1, DL2, . . . , DLN) and calculate the signal opposite the sum of noises corresponding to the sum through the lookup table 820.

The calculated signal opposite the sum of noises may be added to the output (VO) by the adder 2210, as illustrated in FIG. 8, so that the noise (NDT) is removed from the output (VO).

Embodiment 1-2 for Removing Noise

Figure 11:
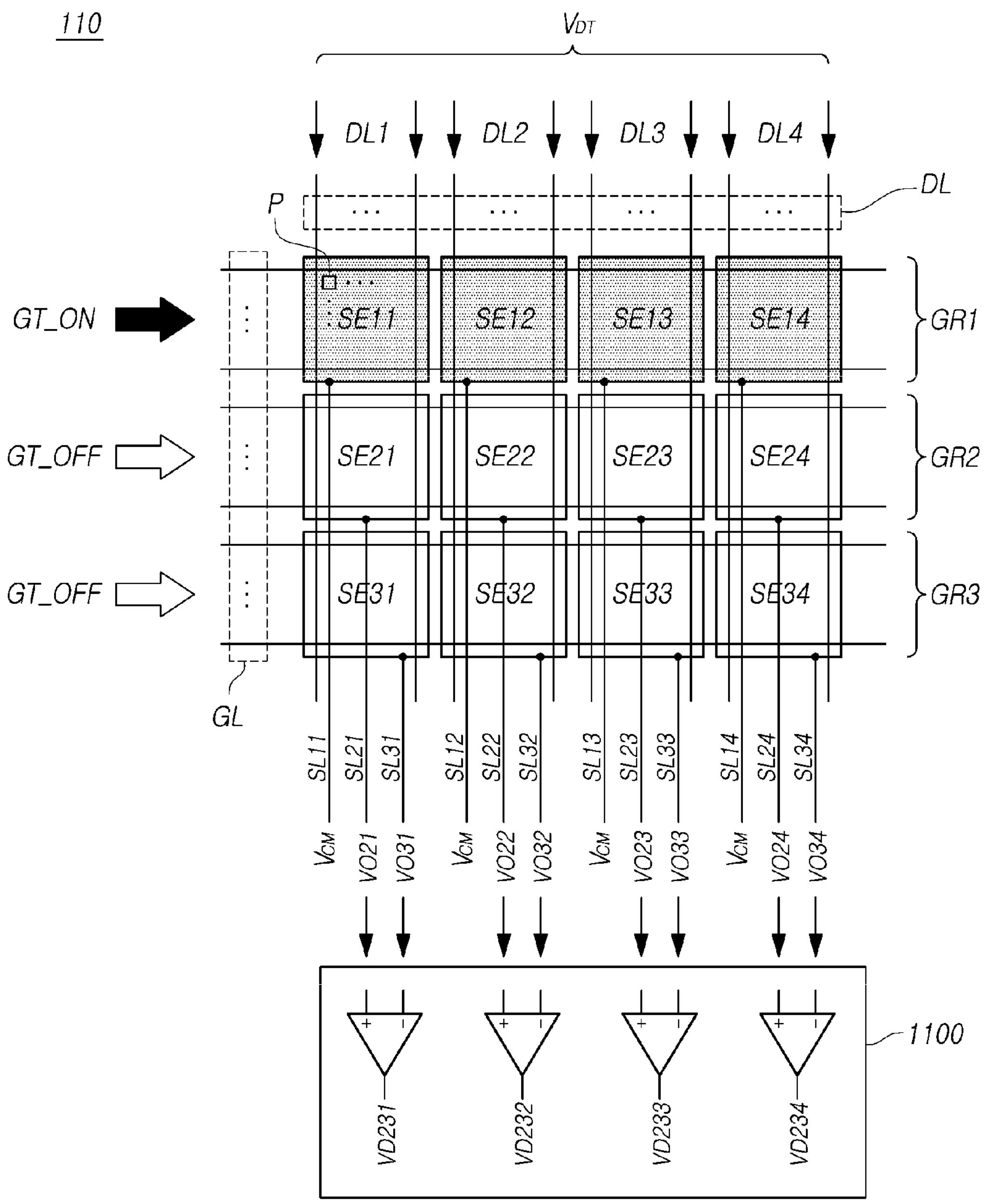
FIG. 11 illustrates the removal of noise through a differential scheme.

FIG. 11 illustrates the removal of noise through a differential scheme. FIG. 2A is temporally followed by FIG. 11.

Referring to FIG. 11, the turn-on scan signal (GT_ON) is supplied to pixels (P) of the first group (GR1), and turn-off scan signals (GT_OFF) are supplied to pixels (P) of the second group (GR2) and the third group (GR3). Data signals (VDT) are supplied to data lines (DL). Common voltages (VCM) are supplied to sensing lines (SL11 to SL14) connected to sensor electrodes (SE11 to SE14) belonging to the first group (GR1).

At this time, sensor electrodes (SE21 to SE24 and SE31 to SE34) belonging to the second group (GR2) and the third group (GR3) may be used for touch sensing, and accordingly, sensor-driving signals (VSE) are supplied to the sensor electrodes (SE21 to SE24 and SE31 to SE34) belonging to the second group (GR2) and the third group (GR3), as illustrated in FIG. 2A. Further, as illustrated in FIG. 11, which is the subsequent process, a sensing circuit 1100 further included in the display device 100 may receive sensing signals (VO21 to VO 24 and VO31 to VO34) from sensing lines (SL21 to SL24 and SL31 to S34) connected to the second group (GR2) and the third group (GR3).

The sensing signals (VO21 to VO 24 and VO31 to VO34) may include the noise (NDT) by the above-described data signal (VDT). The sensing circuit may differentially process sensing signals of two sensor electrodes connected to the same data line (DL) in order to remove the noise (NDT).

For example, the sensing circuit 1100 may receive sensing signals (VO21 and VO31) from the sensor electrodes SE21 and SE31 connected to the first data line (DL1) and generate a first differential sensing signal (VD231) corresponding to the difference between the sensing signals (VO21 and VO31). In the same way, the sensing circuit 1100 may receive sensing signals (VO22 and VO32) from the sensor electrodes SE22 and SE32 connected to the second data line (DL2) and generate a second differential sensing signal (VD232) corresponding to the difference between the sensing signals (VO22 and VO32). Further, the sensing circuit 1100 may receive sensing signals (VO23 and VO33) from the sensor electrodes SE23 and SE33 connected to the third data line (DL3) and generate a third differential sensing signal (VD233) corresponding to the difference between the sensing signals (VO23 and VO33), and may receive sensing signals (VO24 and VO34) from the sensor electrodes SE24 and SE34 connected to the fourth data line (DL4) and generate a fourth differential sensing signal (VD234) corresponding to the difference between the sensing signals (VO24 and VO34).

The same noise (NDT) may be highly likely to flow in sensor electrodes connected to the same data line (DL). Accordingly, the differential sensing signal (VD231, VD232, VD233, or VD234) corresponding to the difference between the sensing signals of the sensor electrodes connected to the same data line (DL) may include only a signal from which the noise (NDT) is removed.

The sensing circuit 1100 may recognize a touch without being influenced by the noise (NDT) by the data signal (VDT) by recognizing the touch based on the differential sensing signals (VD231, VD232, VD233, and VD234).

Figure 12:
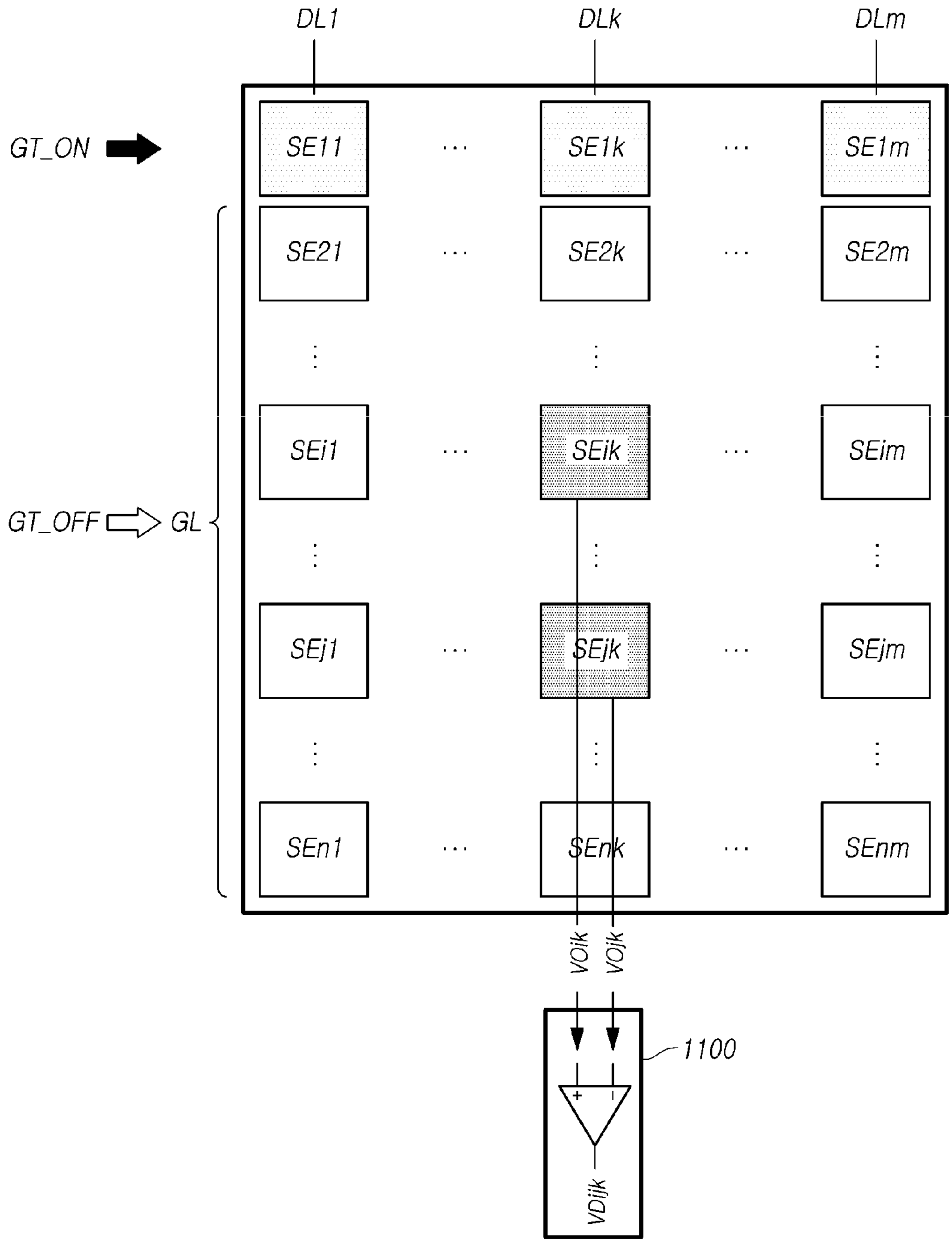
FIG. 12 illustrates an example of expansion of FIG. 11.

FIG. 12 illustrates an example that expands on that of FIG. 11.

Referring to FIG. 12, the turn-on scan signal (GT_ON) may be input into one group. Accordingly, the turn-off scan signal (GT_OFF) may be input into the remaining groups, into which the turn-on scan signal (GT_ON) has not been input. Accordingly, sensor electrodes belonging to the groups into which the turn-off scan signal (GT_OFF) is input may be used for touch sensing.

Further, since the same data signal is supplied to the sensor electrodes connected to the same data line, the sensing circuit 1100 may select two sensor electrodes from among electrodes of a group, which is connected to the same data line and into which the turn-off scan signal (GT_OFF) is input, in other words, of which a display is not updated, and differentially sense sensing signals of the corresponding sensor electrodes.

Referring to FIG. 12, N×M sensor electrodes (SE11 to SEnm) may be located on the panel 110. At this time, when the turn-on scan signal (GT_ON) is supplied to pixels (P) corresponding to sensor electrodes (SE11 to SE1*m*) of a first line, for a kth data line (DLk), the sensing circuit 1100 may recognize a touch of an ith sensor electrode (SEik) or a jth sensor electrode (SEjk) based on a differential sensing signal (VDijk) corresponding to the difference between sensing signals (VOik and VOjk) of the ith sensor electrode (SEik) and the jth sensor electrode (SEjk).

When there is a plurality of (three or more) sensor electrodes, in which the turn-off scan signal (GT_OFF) is input, for the same data line (DL), the sensing circuit 1100 may generate a plurality of differential sensing signals while setting different combinations of sensor electrodes to be differentially processed.

For example, the sensing circuit 1100 may generate a first differential sensing signal for the ith sensor electrode (SEik) by differentially sensing the sensing signals (VOik and VOjk) of the ith sensor electrode (SEik) and the jth sensor electrode (SEjk) for the kth data line (DLk). The sensing circuit 1100 may generate a second differential sensing signal for the ith sensor electrode (SEik) by differentially sensing signals (VOik and VO(j+1)k) of the ith sensor electrode (SEik) and a (j+1)th sensor electrode (SE(j+1)k), and generate a third differential sensing signal for the ith sensor electrode (SEik) by differentially sensing signals (VOik and VO(j+2)k) of the ith sensor electrode (SEik) and a (j+2)th sensor electrode (SE(j+2)k). The sensing circuit 1100 may recognize the touch for the ith sensor electrode (SEik) by combining the plurality of differential sensing signals. More specifically, the sensing circuit 1100 may recognize the touch for the ith sensor electrode (SEik) based on an average value of the first differential sensing signal, the second differential sensing signal, and the third differential sensing signal. In another example, the sensing circuit 1100 may recognize the touch for the ith sensor electrode (SEik) based on an intermediate value of the first differential sensing signal, the second differential sensing signal, and the third differential sensing signal.

Figure 13:
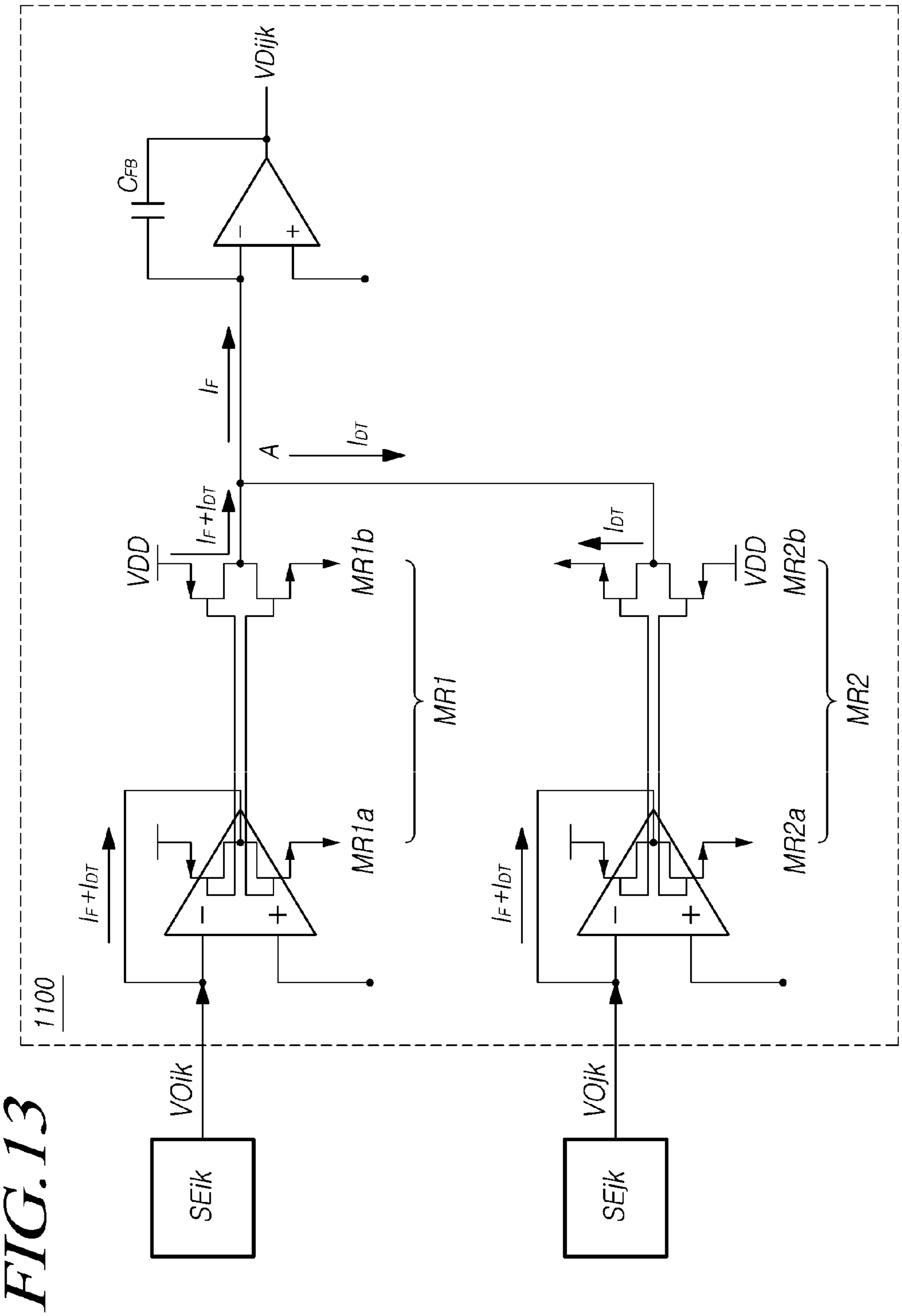
FIG. 13 schematically illustrates the internal configuration of a sensing circuit of FIG. 12.

FIG. 13 schematically illustrates the internal configuration of the sensing circuit of FIG. 12.

Referring to FIG. 13, the sensing signals (VOik and VOjk) of the ith sensor electrode (SEik) and the jth sensor electrode (SEjk) for the kth data line (DLk) in FIG. 12 are transmitted to the sensing circuit 1100.

The sensing circuit 1100 includes two mirror circuits (MR1 and MR2). The first mirror circuit (MR1) includes a first input mirror circuit (MR1*a*) and a first output mirror circuit (MR1*b*), and the second mirror circuit (MR2) includes a second input mirror circuit (MR2*a*) and a second output mirror circuit (MR2*b*).

When a first switch (T_ON) is closed, the sensing signal (VOik) of the ith sensor electrode (SEik) flows to the first input mirror circuit (MR1*a*) in the form of current. At this time, when there is a touch of an object on the ith sensor electrode (SEik), the current flowing to the first input mirror circuit (MR1*a*) includes a touch current (IF) and a noise current (IDT) by a data signal.

The same current as the current flowing to the first input mirror circuit (MR1*a*) is output through the first output mirror circuit (MR1*b*) according to mirroring.

When the first switch (T_ON) is closed, the sensing signal (VOjk) of the jth sensor electrode (SEjk) flows to the second input mirror circuit (MR2*a*) in the form of current. At this time, the ith sensor electrode (SEik) and the jth sensor electrode (SEjk) include the noise current (IDT) by the same data signal.

The current flowing to the second input mirror circuit (MR2*a*) is sunk through the second output mirror circuit (MR2*b*) according to mirroring.

Since the first output mirror circuit (MR1*b*) and the second output mirror circuit (MR2*b*) are configured in opposite forms, the first output mirror circuit (MR1*b*) outputs the same current as the current of the first input mirror circuit (MR1*a*), but the second output mirror circuit (MR2*b*) sinks the same current as the current of the second input mirror circuit (MR2*a*). The noise current (IDT) by the data signal equally flows to the first input mirror circuit (MR1*a*) and the second input mirror circuit (MR2*a*), but the first output mirror circuit (MR1*b*) and the second output mirror circuit (MR2*b*) are configured in opposite forms, so that the first output mirror circuit (MR1*b*) outputs the noise current (IDT) and the second output mirror circuit (MR2*b*) sinks the noise current (IDT).

The output of the first output mirror circuit (MR1*b*) and the output of the output second mirror circuit (MR2*b*) may be connected to each other by sharing a node (A). Accordingly, the noise current (IDT), among the output currents of the first output mirror circuit (MR1*b*), is sunk to the second output mirror circuit (MR2*b*). Further, the current (IF) among the output currents of the first output mirror circuit (MR1*b*) except for the noise current (IDT) flows to a rear OP Amp and a differential sensing signal (VDijk) is generated.

Although not illustrated in FIG. 13, the sensing circuit 1100 may further include a coordinate generator (not shown) for receiving the differential sensing signal (VDijk), and may generate touch information, such as touch coordinates, through the coordinate generator (not shown).

Embodiment 1-3 for Removing Noise

Figure 14:
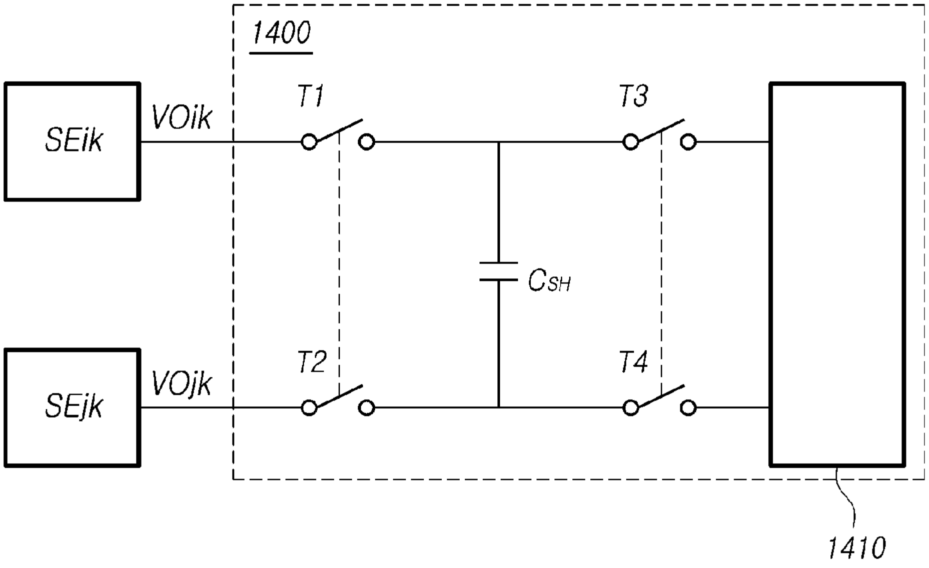
FIG. 14 schematically illustrates the internal configuration of a sensing circuit for removing noise in a charge-sharing scheme.

FIG. 14 schematically illustrates the internal configuration of the sensing circuit for removing noise through a charge-sharing scheme.

Referring to FIG. 14, the sensing signals (VOik and VOjk) of the ith sensor electrode (SEik) and the jth sensor electrode (SEjk) for the kth data line (DLk) in FIG. 12 are transmitted to a sensing circuit 1400.

The sensing circuit 1400 may include four switches (T1, T2, T3, and T4), shared capacitance (CSH), and a signal-processing circuit 1410.

The first switch (T1) and the second switch (T2) are closed at a first sensing time and opened at a second sensing time while linking with each other. The third switch (T3) and the fourth switch (T4) are opened at the first sensing time and closed at the second sensing time while linking with each other.

When the first switch (T1) and the second switch (T2) are closed at the first sensing time, the difference between the sensing signals (VOik and VOjk) of the ith sensor electrode (SEik) and the jth sensor electrode (SEjk) is charged in the shared capacitance (CSH). At this time, since the difference between the sensing signals (VOik and VOjk) is charged in the shared capacitance (CSH), noises by the data signals included in the respective sensing signals (VOik and VOjk) offset each other, and thus are not charged in the shared capacitance (CSH). The sensing circuit 1400 may charge a signal, in which the noises by the data signals offset each other, in the shared capacitance (CSH) according to the charge-sharing scheme.

When the second sensing time arrives, the first switch (T1) and the second switch (T2) are opened, and the sensing signals (VOik and VOjk) do not flow into the shared capacitance (CSH) anymore. The third switch (T3) and the fourth switch (T4) are closed at the second sensing time and thus the shared capacitance (CSH) and the signal-processing circuit 1410 are connected to each other.

The signal-processing circuit 1410 may measure a voltage or charge of the shared capacitance (CSH) and generate touch information of the ith sensor electrode (SEik) or the jth sensor electrode (SEjk).

Embodiment 1-4 for Removing Noise

It is possible to improve noise removal through the data signal supply method by the data-driving circuit 120.

The data-driving circuit 120 may supply a data signal in an inversion scheme. The inversion scheme is a scheme of periodically reversing and driving polarities of pixels. The inversion scheme includes a dot inversion scheme, a line inversion scheme, a column inversion scheme, and a z-inversion scheme, and the data-driving circuit 120 may supply a data signal through the inversion scheme.

Figure 15:
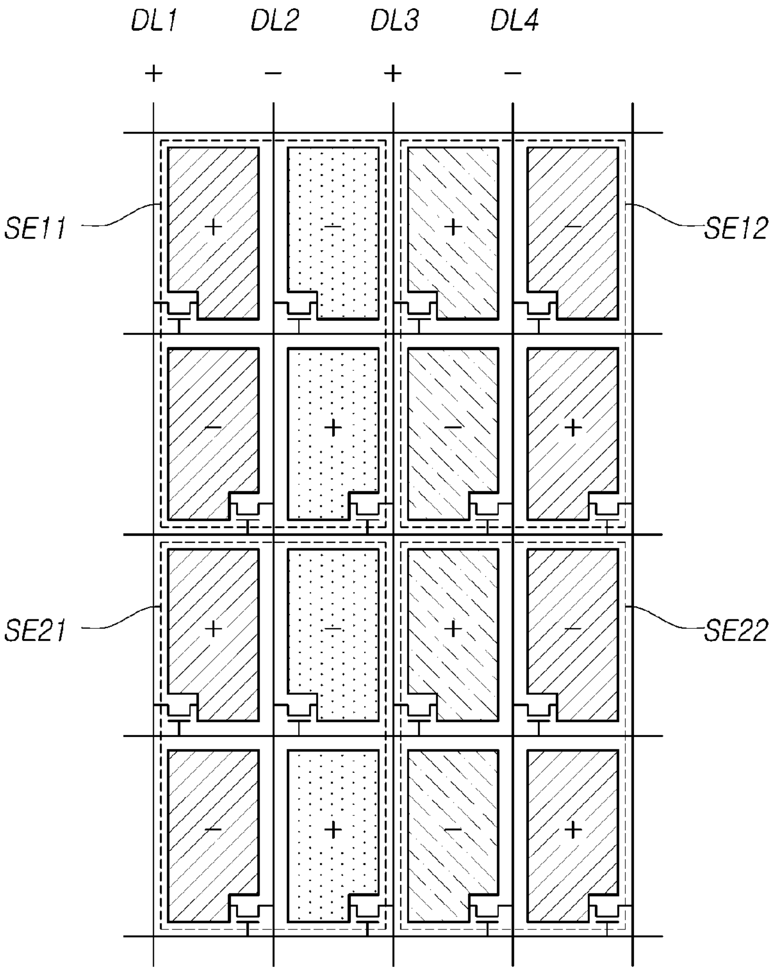
FIG. 15 illustrates a pixel structure in an inversion scheme.

FIG. 15 illustrates a pixel structure in the inversion scheme. In FIG. 15, pixels marked by + are pixels driven with a positive polarity and pixels marked by − are pixels driven with a negative polarity.

The data-driving circuit 120 may drive pixels with polarities reversed for respective data lines, as illustrated in FIG. 15. In other words, the data-driving circuit 120 may supply data signals reversed for respective data lines. For example, in a first frame, the data-driving circuit 120 may supply a data signal having a positive polarity to a first data line (DL1) and a data signal having a negative polarity to a second data line (DL2). The data-driving circuit 120 may supply a data signal having a positive polarity to a third data line (DL3) and a data signal having a negative polarity to a fourth data line (DL4). In such a manner, the data-driving circuit 120 may alternately supply the data signal having the positive polarity and the data signal having the negative polarity to the data lines.

As the data-driving circuit 120 supplies the data signals through the inversion scheme, adjacent pixels may be driven with different polarities.

In the display device 100, two or more data lines, to which reversed data signals are supplied, may be located on one sensor electrode. At this time, data lines located on one sensor electrode in the display device 100 may be even-numbered. At this time, the data-driving circuit 120 may supply the data signals having the positive polarity to half of the data lines located on one sensor electrode in the display device 100 and the data signals having the negative polarity to the other half of the data lines.

In the display device 100, a plurality of pixels may be located on one sensor electrode. Further, the data-driving circuit 120 may drive the plurality of pixels with different polarities. The plurality of pixels in an N×M array may be located on one sensor electrode. At this time, N denotes N lines perpendicular to the data lines, and M denotes M lines parallel to the data lines.

In the display device 100, pixels located on one sensor electrode may be even-numbered. At this time, the data-driving circuit 120 may drive the half pixels with the positive polarity and the other half pixels with the negative polarity.

In the display device 100, the number of pixels located on one sensor electrode may be a multiple of 4. Further, the pixels may be located on one sensor electrode in the display device 100 in an N×M array, where N and M may be even numbers.

When pixels or data lines having different polarities are located on one sensor electrode, noise by the data signal or noise by the data voltage may offset each other upon touch sensing.

Second Embodiment (Embodiment of IP2015 310)

Meanwhile, the display device 100 may supply data signals to display electrodes located on pixels (P) and sensor-driving signals to sensor electrodes (SE) at the same time. At this time, the display device 100 may change the data signals in accordance with the sensor-driving signals in order to maintain the data voltage formed between the display electrode and the sensor electrode (SE) on the pixel (P) constant for a predetermined time (for example, the time of one frame).

Figure 16:
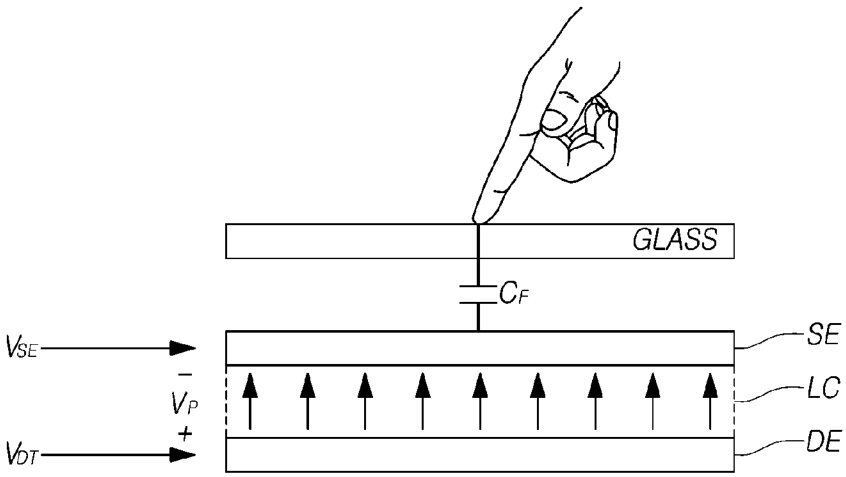
FIG. 16 schematically illustrates a cross section of the pixel of FIG. 1.
Figure 17:
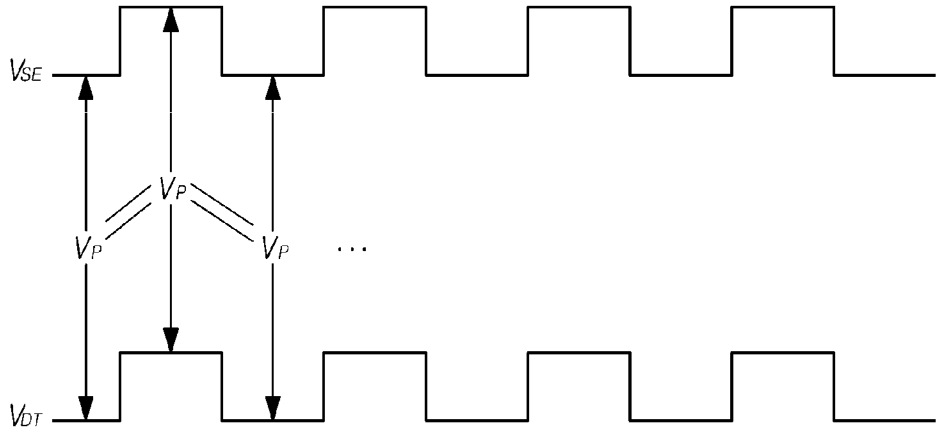
FIG. 17 schematically illustrates waveforms of signals supplied to respective electrodes according to a second embodiment.
Figure 18:
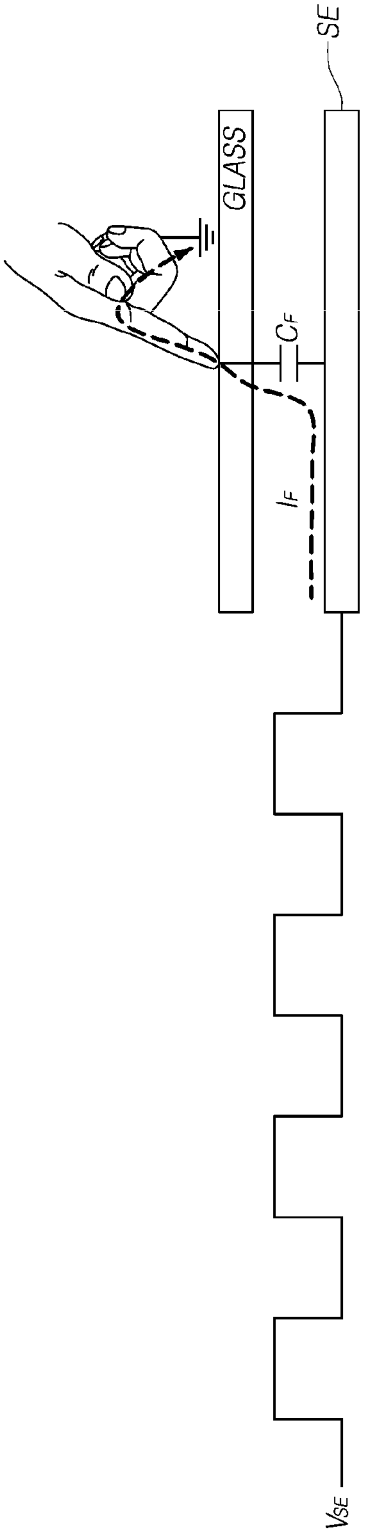
FIG. 18 illustrates the principle in which a touch is sensed according to a sensor-driving signal supplied to a sensor electrode.

FIG. 16 schematically illustrates a cross section of the pixel of FIG. 1, FIG. 17 schematically illustrates waveforms of signals supplied to respective electrodes according to the second embodiment, and FIG. 18 illustrates the principle of sensing a touch according to a sensor-driving signal supplied to a sensor electrode.

Referring to FIG. 16, a Liquid Crystal (LC) may be located between a display electrode (DE) and a sensor electrode (SE).

Referring to FIGS. 16 and 17, a data signal (VDT) may be supplied to the display electrode (DE) and a sensor-driving signal (VSE) may be supplied to the sensor electrode (SE).

According to the signals (VDT and VSE), a data voltage (VP) by a potential difference between the display electrode (DE) and the sensor electrode (SE) may be formed on the liquid crystal (LC). Further, an electric field is formed by the data voltage (VP) and an array of the liquid crystal (LC) is determined according to the electric field, and, as a result, the brightness or grayscale value of the pixel (P) may be determined.

At this time, in order to maintain the brightness or grayscale value of the pixel (P) constant for a predetermined time (for example, the time of one frame), the data voltage (VP) may be maintained constant for the corresponding time.

On the other hand, the sensor-driving signal (VSE) may have a consistently modulated waveform for the corresponding time (for example, the time of one frame) in order to measure capacitive coupling (CF) formed between the sensor electrode (SE) and an external object. Referring to FIG. 18, the sensor-driving signal (VSE) may have an AC waveform that varies periodically. A touch current (IF) may flow to the coupling (CF) formed between the sensor electrode (VSE) and the object according to the AC waveform of the sensor-driving signal (VSE), and it may be determined whether the object is in proximity to or in contact with the sensor electrode (SE) according to the amount of the touch current (IF) or the presence or absence of the touch current (IF).

Meanwhile, since the sensor electrode (SE) and the display electrode (ED) link with each other, if the sensor-driving signal (VSE) is consistently changed as described above, the data signal (VDT) may also be consistently changed.

Referring to FIG. 17, the data signal (VDT) may be changed in accordance with the sensor-driving signal (VSE) in order to maintain a predetermined data voltage (VP) between the data signal (VDT) and the sensor-driving signal (VSE). In a detailed example, the data signal (VDT) may be changed with the same phase and the same amplitude as those of the sensor-driving signal (VSE).

Meanwhile, although FIGS. 17 to 18 illustrate the sensor-driving signal (VSE) as a signal having a predetermined frequency and amplitude, various modulation methods may be additionally applied to the sensor-driving signal (VSE).

For example, a frequency modulation method may be applied to the sensor-driving signal (VSE). In this case, the sensor-driving circuit 140 may sense the touch through a method of modulating the frequency of the sensor-driving signal (VSE), supplying the changed sensor-driving signal (VSE) to the sensor electrode (SE), and demodulating a sensing signal for the sensor electrode (SE). At this time, the sensor-driving circuit 140 may select a frequency (for example, a frequency of 60 Hz or a harmonic frequency thereof) used for updating a display or a modulated frequency of the sensor-driving signal (VSE) such that the noise by the frequency generated by another circuit (for example, a data-driving circuit) is avoided.

In another example, a phase modulation method or a code modulation method may be applied to the sensor-driving signal (VSE). In this case, the sensor-driving circuit 140 may sense the touch through a method of demodulating the sensing signal according to the modulation method used for modulating the sensor-driving signal (VSE).

Meanwhile, the display device 100 may also use a method of changing a ground voltage linked with the data signal (VDT) in order to change the data signal (VDT) in accordance with the sensor-driving signal (VSE), as described with reference to FIGS. 16 to 18. A method of changing the data signal (VDT) by the change in the ground voltage will be described with reference to FIGS. 19 and 20.

Figure 19:
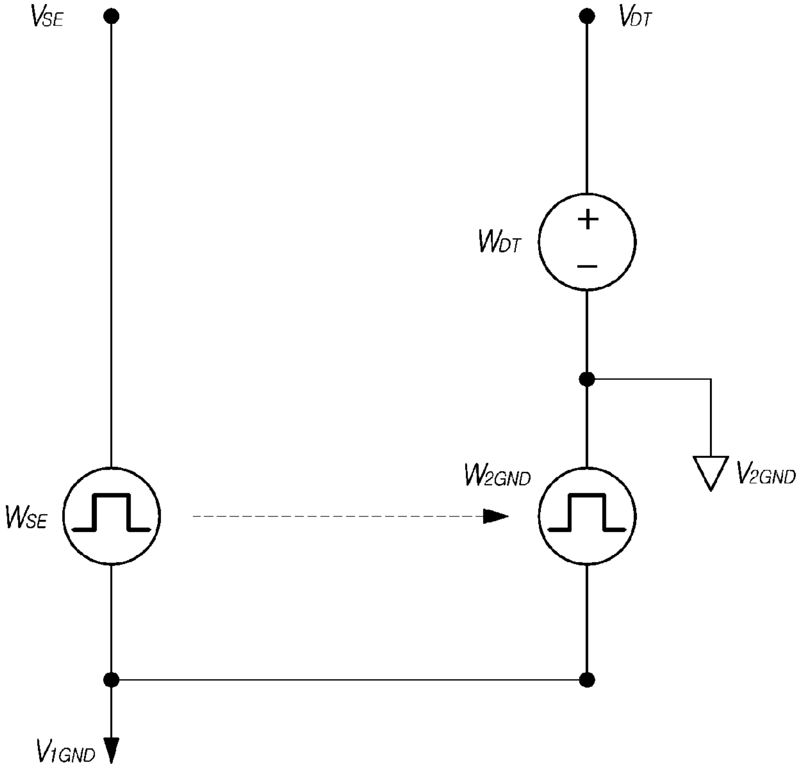
FIG. 19 illustrates ground voltages of a data signal and a sensor-driving signal.
Figure 20:
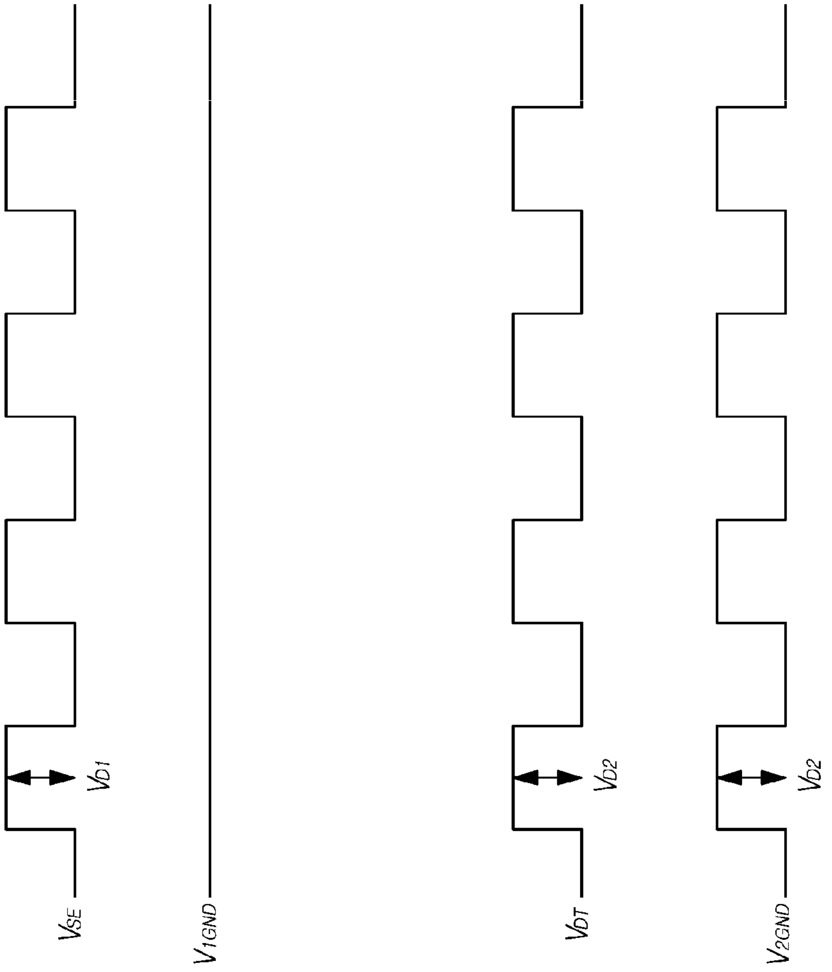
FIG. 20 illustrates waveforms of a data signal, a sensor-driving signal, and ground voltages illustrated in FIG. 19.

FIG. 19 illustrates ground voltages of the data signal and the sensor-driving signal, and FIG. 20 illustrates waveforms of the data signal, the sensor-driving signal, and the ground voltage illustrated in FIG. 19.

Referring to FIG. 19, the sensor-driving signal (VSE) may be linked with a first ground voltage (V1GND) through a sensor-driving voltage generator (WSE), and the data signal (VDT) may be linked with a second ground voltage (V2GND) through a data-driving voltage generator (WDT). At this time, the second ground voltage (V2GND) may receive the voltage from a second ground voltage generator (W2GND), and the second ground voltage generator (W2GND) may be linked with the sensor-driving voltage generator (WSE).

Specifically, one side of the sensor-driving voltage generator (WSE) may be connected to the first ground voltage (V1GND), and the other side thereof may output the sensor-driving signal (VSE). One side of the data-driving voltage generator (WDT) may be connected to the second ground voltage generator (W2GND), and the other side thereof may output the data signal (VDT). One side of the second ground voltage generator (W2GND) may be connected to the first ground voltage (V1GND), and the other side thereof may output the second ground voltage (V2GND). At this time, the second ground voltage generator (W2GND) may operate through a link with the sensor-driving voltage generator (WSE).

Referring to FIGS. 19 and 20, the sensor-driving signal (VSE) may have a consistently modulated waveform in order to drive the sensor electrode (SE). At this time, the waveform of the sensor-driving signal (VSE) may be supplied by the sensor-driving voltage generator (WSE) linked with the first ground voltage (V1GND).

The data signal (VDT) may receive a waveform from the data-driving voltage generator (WDT), and at this time, the waveform from the data-driving voltage generator (WDT) may maintain a predetermined voltage for a predetermined time (for example, the time of one frame). However, the data-driving voltage generator (WDT) is connected to the second ground voltage generator (W2GND), and the waveform of the data signal (VDT) may be changed according to the waveform of the second ground voltage generator (W2GND).

Referring to FIGS. 19 and 20, the second ground voltage (V2GND) may be consistently changed according to the waveform supplied by the second ground voltage generator (W2GND). The data signal (VDT) may be changed to be the same as the second ground voltage (V2GND) while being linked with the second ground voltage (V2GND).

Specifically, the sensor-driving voltage generator (WSE) may supply the sensor-driving signal (VSE), which varies with a first amplitude (VD1). At this time, the second ground voltage generator (W2GND) may supply the second ground voltage (V2GND) while being linked with the sensor-driving voltage generator (WSE), having the same phase as that of the sensor-driving signal (VSE), and varying with a second amplitude (VD2). Since one side of the data-driving voltage generator (WDT) is connected to the second ground voltage (V2GND), the data signal (VDT), which is the output voltage thereof, may also vary with a second amplitude (VD2) while having the same phase as that of the sensor-driving signal (VSE), like the second ground voltage (V2GND).

Meanwhile, the sensor-driving signal (VSE) may have a waveform that is modulated only in a particular interval.

Figure 21:
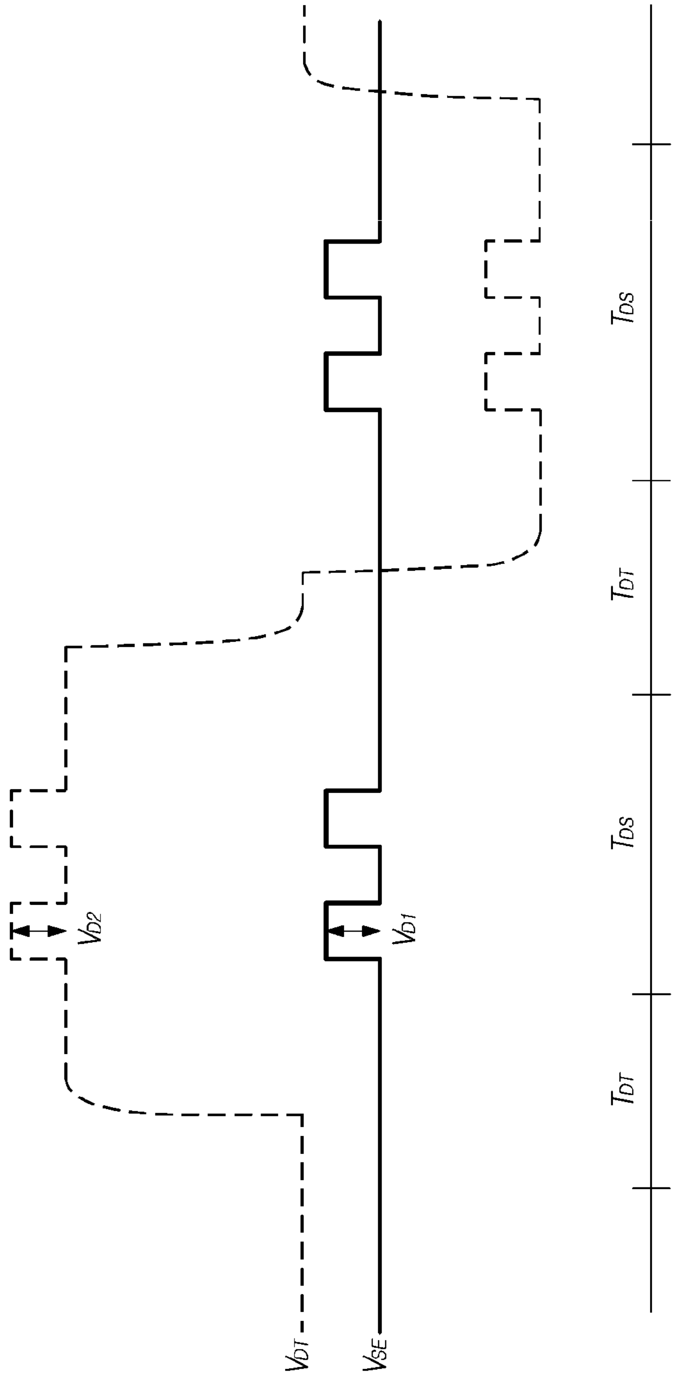
FIG. 21 illustrates waveforms of a sensor-driving signal modulated only in a particular interval and a data signal corresponding thereto.

FIG. 21 illustrates waveforms of the sensor-driving signal (VSE) modulated only in a particular interval and the data signal corresponding thereto.

Referring to FIG. 21, the data signal (VDT) may have a waveform divided into a transition interval (TDT) and a stabilization interval (TDS).

The transition interval (TDT) is an interval in which the data signal (VDT) is changed. For example, the data signal (VDT) has a waveform for forming the data voltage on a plurality of pixels (see P in FIG. 21), and at this time, the interval in which the voltage for a first pixel is changed into the voltage for a second pixel is the transition interval (TDT). The transition interval (TDT) may correspond to an interval in which transistors (see TD in FIG. 21) connected to data lines (see DL in FIG. 21) are not turned on.

The stabilization interval (TDS) is an interval in which the data signal (VDT) is stabilized. For example, when the transistor (see TD in FIG. 21) connected to the pixel (see P in FIG. 21) is turned on, the data signal (VDT) has a stabilized voltage level at which the data voltage of the corresponding pixel (see P in FIG. 21) is maintained constant, which corresponds to the stabilization interval (TDS). The stabilization interval (TDS) may correspond to an interval in which the transistor (see TD in FIG. 21) connected to the data line (see DL in FIG. 21) is turned on.

Referring to FIG. 21, the sensor-driving signal (VSE) may have a waveform that is modulated only in the stabilization interval (TDS). Specifically, the sensor-driving signal (VSE) may maintain a predetermined value in the transition interval (TDT), and may be modulated to a square wave having a first amplitude (VD1) in the stabilization interval (TDS). At this time, the second ground voltage (V2GND) linked with the sensor-driving signal (VSE) may be modulated to a square wave having a second amplitude (VD2) only in the stabilization interval (TDS), and the data signal (VDT) linked with the second ground voltage (V2GND) may be changed to have the second amplitude (VD2) only in the stabilization interval (TDS).

Meanwhile, although the embodiment in which the sensor-driving signal (VSE) has the modulated waveform only in the particular interval has been described with reference to FIG. 21, the present invention is not limited thereto.

The sensor-driving signal (VSE) may have the modulated waveform regardless of the interval. Since the second ground voltage (V2GND) is changed while being linked with the sensor-driving signal (VSE), the data voltage formed on the pixel (P) may be actually independent from the sensor-driving signal (VSE), and accordingly, the sensor-driving signal (VSE) may have a modulated waveform regardless of the data signal (VDT) or the particular interval.

Meanwhile, the data signal (VDT) in the changing interval (for example, in the transition interval (TDT)) may influence the sensor-driving signal (VSE) as noise, but if the sensor electrode (SE) is sensed through the differential scheme, the noise by the data signal (VDT) may be offset.

As described above, the display device 100 may change the data signal (VDT) in accordance with the sensor-driving signal (VSE) by changing the second ground voltage (V2GND) linked with the data signal (VDT).

Figure 22:
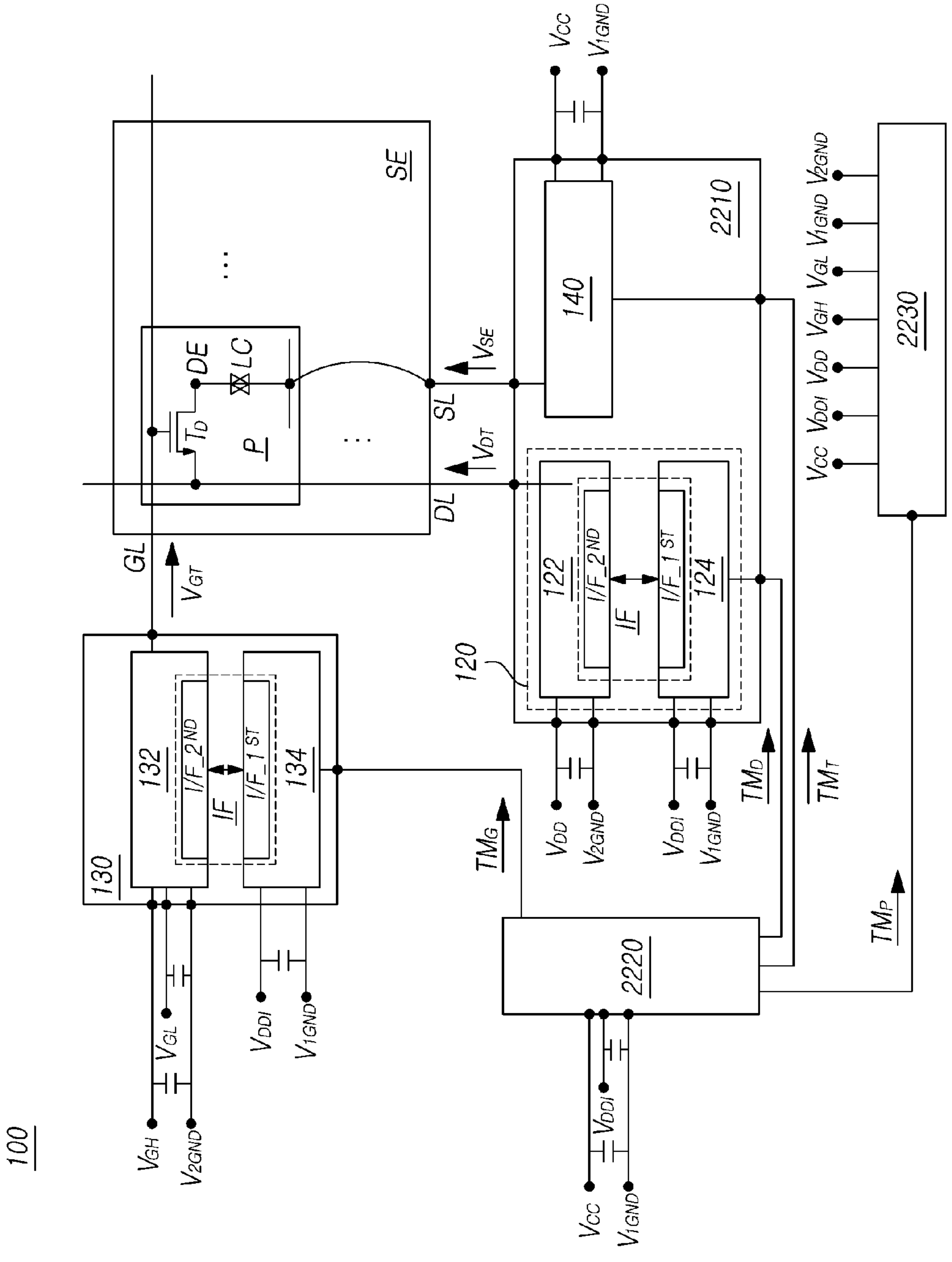
FIG. 22 schematically illustrates voltages and signals within the display device of FIG. 1.

FIG. 22 schematically illustrates voltages and signals within the display device of FIG. 1.

Referring to FIG. 22, the data-driving circuit 120 may include a data-driving block 122 and a data-timing block 124. At this time, the data-driving block 122 for supplying the data signal (VDT) to the display electrode (DE) through the data line (DL) may be connected to a second supply voltage (VDD) and to a second ground voltage (V2GND). Further, the data-timing block 124 for processing a timing signal of the data signal (VDT) may be connected to a first supply voltage (VDDI) and to a first ground voltage (V1GND).

The data-timing block 124 may transmit the timing signal to the data-driving block 122, and the data-driving block 122 may generate the data signal (VDT) according to the timing signal. At this time, since the ground voltage levels of the data-timing block 124 and the data-driving block 122 are different, the data-driving circuit 120 may further include an interface conversion circuit (I/F) for converting signals having different ground voltage levels.

Based on such a structure, although the data-driving circuit 120 includes two blocks 122 and 124 having different ground voltages, the data-driving circuit 120 may exchange signals between the two blocks 122 and 124 through the interface conversion circuit (I/F).

The sensor-driving circuit 140 may be connected to a third supply voltage (VCC) and the first ground voltage (V1GND). Further, the sensor-driving circuit 140 may supply the sensor-driving signal (VSE) to the sensor electrode (SE) through the sensing line (SL) based on the third supply voltage (VCC) and the first ground voltage (V1GND).

Meanwhile, the data-driving circuit 120 and the sensor-driving circuit 140 may be included in one integrated circuit 2210. At this time, the integrated circuit 2210 may have two ground patterns separated from each other, and each ground pattern may be connected to the first ground voltage (V1GND) and to the second ground voltage (V2GND). Further, the first supply voltage (VDDI) and the third supply voltage (VCC) supplied to the integrated circuit 2210 may be linked with the first ground voltage (V1GND), and the second supply voltage (VDD) may be linked with the second ground voltage (V2GND).

Referring to FIG. 22, the gate-driving circuit 130 may include a gate-driving block 132 and a gate-timing block 134. At this time, the gate-driving block 132 for supplying a gate signal (VGT) to a transistor (TD) located on the pixel (P) through a gate line (GL) may be connected to a gate high voltage (VGH), a gate low voltage (VGL), and the second ground voltage (V2GND). Further, the gate-timing block 134 for processing a timing signal of the gate signal (VGT) may be connected to a first supply voltage (VDDI) and to a first ground voltage (V1GND).

The gate-timing block 134 may transmit the timing signal to the gate-driving block 132, and the gate-driving block 132 may generate the gate signal (VGT) according to the timing signal. At this time, since the ground voltage levels of the gate-timing block 134 and the gate-driving block 132 are different, the gate-driving circuit 130 may further include an interface conversion circuit (I/F) for converting signals having different ground voltage levels.

Based on such a structure, although the gate-driving circuit 130 includes two blocks 132 and 134 having different ground voltages, the gate-driving circuit 130 may exchange signals between the two blocks 132 and 134 through the interface conversion circuit (I/F).

The display device 100 may further include a timing control circuit 2220 and a power circuit 2230.

Referring to FIG. 22, the timing control circuit 2220 may transmit timing information (TMG, TMD, TMT, and TMP)

including timing signals to the data-driving circuit 120, the gate-driving circuit 130, the sensor-driving circuit 140, and the power circuit 2230. The timing control circuit 2220 may transmit first timing information (TMG) including a timing signal for gate driving to the gate-driving circuit 130 and second timing information (TMD) including a timing signal for data driving to the data-driving circuit 120. Further, the timing control circuit 2220 may transmit third timing information (TMT) including a timing signal for sensor driving to the sensor-driving circuit 140 and fourth timing information (TMP) including a timing signal for generating a power supply voltage to the power circuit 2230.

At this time, each piece of the timing information (TMG, TMD, TMT, and TMP) may further include other additional information. For example, the second timing information (TMD) transmitted to the data-driving circuit 120 may further include image data information, and the data-driving circuit 120 may generate the data signal (VDT) based on the image data information.

Meanwhile, the timing control circuit 2220 may be connected to the first supply voltage (VDDI), the third supply voltage (VCC), and the first ground voltage (V1GND). Accordingly, the timing information (TMG, TMD, TMT, and TMP) may have voltage levels linked with the first ground voltage (V1GND).

The gate-driving circuit 130 and the data-driving circuit 120 may receive timing information (TMG and TMD) linked with the first ground voltage (V1GND) from the timing control circuit 2220. At this time, the gate-driving circuit 130 and the data-driving circuit 120 may use the timing information (TMG and TMD) linked with the first ground voltage (V1GND) after converting the timing information (TMG and TMD) into signals at the level of the second ground voltage (V2GND) through the interface conversion circuit (I/F).

The power circuit 2230 may generate and supply each voltage used in the display device 100. For example, the power circuit 2230 may supply the first ground voltage (V1GND) and the second ground voltage (V2GND). Further, the power circuit 2230 may supply the first supply voltage (VDDI) and the third supply voltage (VCC) linked with the first ground voltage (V1GND). In addition, the power circuit 2230 may supply the second supply voltage (VDD), the gate high voltage (VGH), and the gate low voltage (VGL) linked with the second ground voltage (V2GND).

The power circuit 2230 may determine the waveform of the second ground voltage (V2GND) according to the fourth timing information (TMP) received from the timing control circuit 2220 while including the second ground voltage generator (W2GND) described with reference to FIG. 19. At this time, the sensor-driving circuit 140 may determine the waveform of the sensor-driving signal (VSE) according to the third timing information (TMT) received from the timing-control circuit 2220 while including the sensor-driving voltage generator (WSE) described with reference to FIG. 19. As a result, the second ground voltage generator (W2GND) and the sensor-driving voltage generator (WSE) determine the waveforms based on the timing information (TMT and TMP) from the timing control circuit 2220, so that the second ground voltage (V2GND) and the sensor-driving signal (VSE) may be synchronized with each other.

Meanwhile, the data-driving circuit 120, the gate-driving circuit 130, or the integrated circuit 2210 may be manufactured through a twin-well process or a triple-well process in order to realize two grounds, which are separated from each other, and circuits linked with the two grounds in the form of an integrated circuit.

Figure 23:
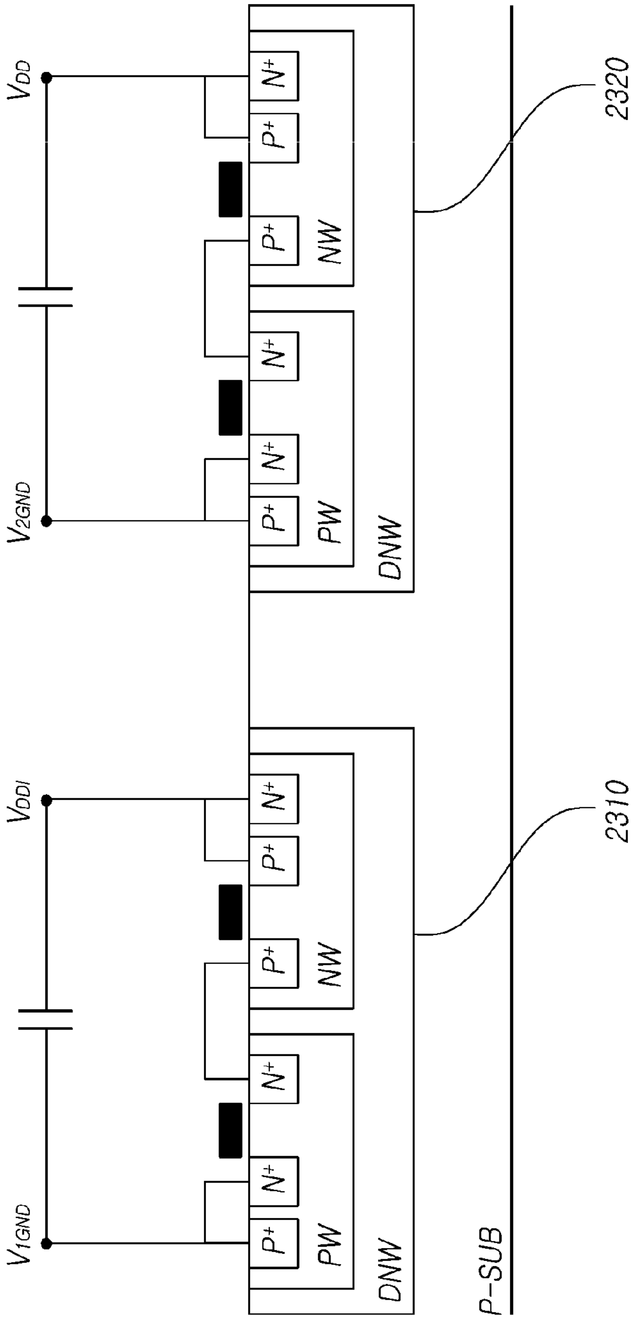
FIG. 23 is a cross-sectional view illustrating a deep n-well structure which can be applied to an integrated circuit included in the display device of FIG. 1.

FIG. 23 is a cross-sectional view illustrating a deep n-well structure which can be applied to an integrated circuit included in the display device of FIG. 1.

In FIG. 23, a cross section 2310 of a semiconductor connected to a first ground voltage (V1GND) and a first supply voltage (VDDI) may be the part of the circuit located in the data-timing block 124 of the data-driving circuit 120. Further, in FIG. 23, a cross section 2320 of a semiconductor connected to a second ground voltage (V2GND) and a second supply voltage (VDD) may be the part of the circuit located in the data-driving block 122 of the data-driving circuit 120.

Referring to FIG. 23, the circuit (the circuit of the data-timing block 124 corresponding to the reference numeral 2310) connected to the first ground voltage (V1GND) is separated, by a Deep N-well (DNW), from the circuit (the circuit of the data-driving block 122 corresponding to the reference numeral 2320) connected to the second ground voltage (V2GND).

Although FIG. 23 illustrates the cross section of only part of the circuit, elements (for example, the data-driving circuit 120, the gate-driving circuit 130, or the integrated circuit 2210) implemented as one integrated circuit in the display device 100 may separate the circuit linked with the first ground voltage (V1GND) and the circuit linked with the second ground voltage (V2GND) using the Deep N-well (DNW).

Figure 24:
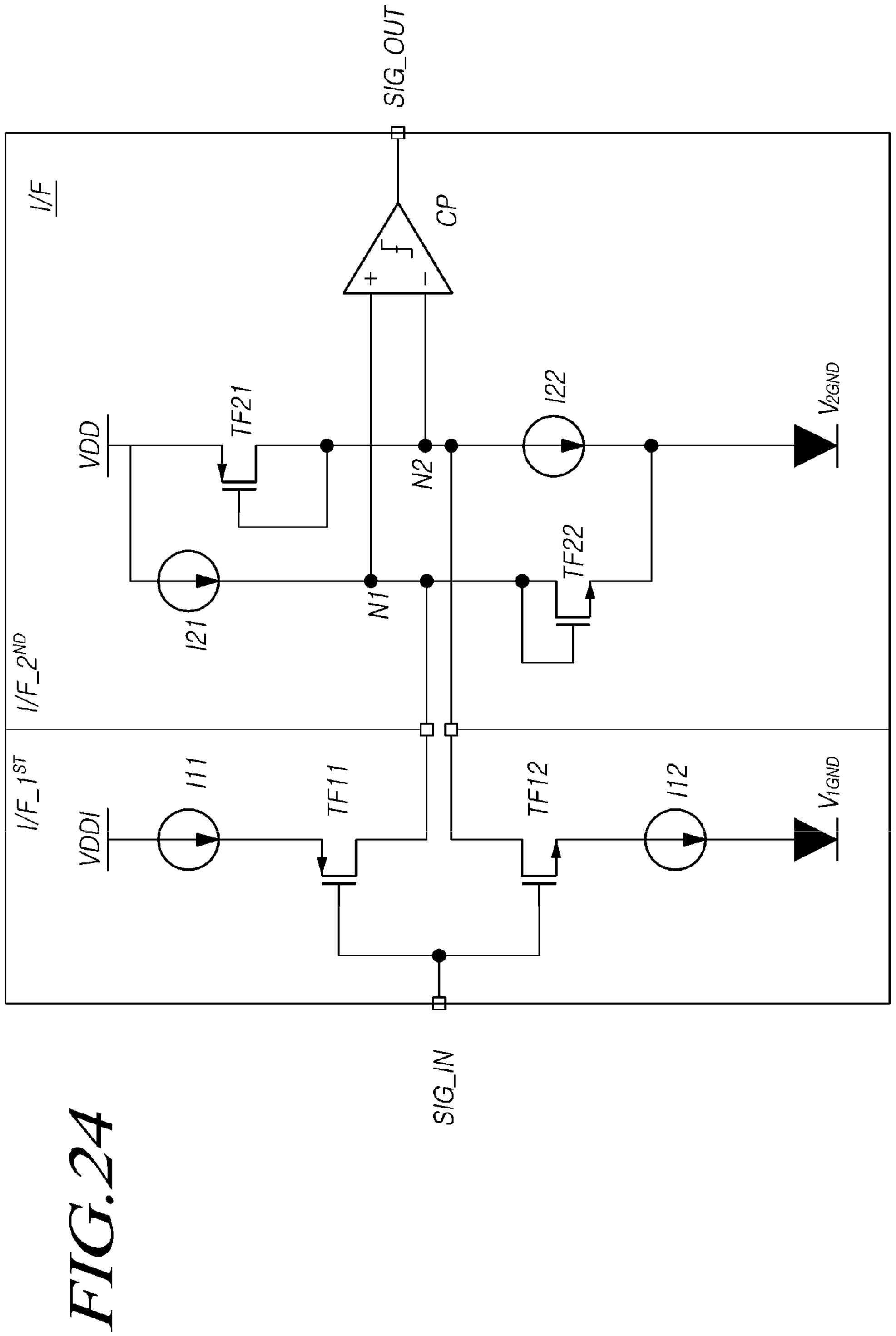
FIG. 24 illustrates the configuration of an example of the interface conversion circuit of FIG. 22.

FIG. 24 illustrates the configuration of an example of the interface conversion circuit of FIG. 22.

Referring to FIG. 24, the interface conversion circuit (I/F) may include a primary side circuit (I/F_1st) connected to a first ground voltage (V1GND) and to a first supply voltage (VDDI) and a secondary side circuit (I/F_2ND) connected to a second ground voltage (V2GND) and to a second supply voltage (VDD).

The primary side circuit (I/F_1st) may include a first transistor (TF11) and a second transistor (TF12), and may further include a first current source (I11) located between the first transistor (TF11) and the first supply voltage (VDDI) and a second current source (I12) located between the second transistor (TF12) and the first ground voltage (V1GND).

The secondary side circuit (I/F_2ND) may include a third transistor (TF21) and a fourth transistor (TF22), and may further include a third current source (I11) connected to the second supply voltage (VDD) and parallel to the third transistor (TF21), and a fourth current source (122) connected to the second ground voltage (V2GND) and parallel to the fourth transistor (TF22).

The third current source (I11), the fourth transistor (TF22), and the first transistor (TF11) are connected to a first node (N1), and the fourth current source (122), the third transistor (TF21), and the second transistor (TF12) are connected to a second node (N2).

An input signal (SIG_IN) of the interface conversion circuit (I/F) is connected to gates of the first transistor (TF11) and the second transistor (TF12).

Further, the first node (N1) and the second node (N2) are connected to a comparator (CP), and the output of the comparator (CP) is connected to an output signal (SIG_OUT).

According to this configuration, the input signal (SIG_IN) linked with the first ground voltage (V1GND) may be converted into the output signal (SIG_OUT) linked with the second ground voltage (V2GND).

Meanwhile, although the above embodiment has described the sensing for the sensor electrode (SE) based on a single-ended scheme, the present invention is not limited thereto, and another sensing scheme, such as a differential scheme, may be applied to the present invention.

Specifically, the display device 100 may apply a differential scheme in order to sense the sensor electrode (SE). The differential scheme has an advantage in that other noise components, as well as a coupling effect between an object and the sensor electrode (SE), can be removed.

According to the above-described embodiments, the display device 100 may recognize the touch on the sensor electrode simultaneously with updating the display of the pixel by supplying the data signal to the display electrode and the sensor-driving signal to the sensor electrode at the same time.

According to an aspect of the present invention, there is an effect of increasing the time for touch driving while maintaining the time for display driving. According to another aspect of the present invention, there is an effect of increasing the time for display driving while maintaining the time for touch driving. According to another aspect of the present invention, there is an effect of increasing both the time for display driving and the time for touch driving. According to another aspect, there is an effect of simultaneously performing display driving and touch driving in some or all intervals.

According to the present invention, there is an effect of generating a sensor-driving signal while maintaining a data voltage of the pixel by changing a ground voltage included in a data-driving circuit or a gate-driving circuit in the display device.

According to the present invention, there is an effect of transmitting and receiving a signal between blocks at different ground levels through an interface conversion circuit. Accordingly, there is an effect of simultaneously realizing the display driving and the touch driving through the change in the ground voltage using the conventional signal without the change in the interface signal.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. An apparatus for driving a panel, the apparatus comprising:

a data driving circuit configured to:

supply a first data signal to a data line during a first scan time section and a second data signal to the data line during a second scan time section, wherein the data line and a display electrode of a pixel are connected with each other during the first and second scan time sections;

based on a common voltage supplied to a common electrode and a result of supplying the first and second data signals, form a first data voltage corresponding to a first grayscale value of the pixel between the display electrode and the common electrode during the first scan time section and a second data voltage corresponding to a second grayscale value of the pixel between the display electrode and the common electrode during the second scan time section; and control a first voltage of the first data signal such that a voltage between the display electrode and the common electrode is maintained as the first data voltage throughout a first predetermined time section within the first scan time section and a second voltage of the second data signal such that a voltage between the display electrode and the common electrode is maintained as the second data voltage throughout a second predetermined time section within the second scan time section; and a sensor driving circuit configured to:

supply a sensor driving signal to the common electrode and modulate, for a touch sensing, a waveform of the sensor driving signal to be an alternating current (AC) waveform in the first predetermined time section within the first scan time section and in the second predetermined time section within the second scan time section, wherein the sensor driving circuit is further configured to select a modulated frequency of the sensor driving signal such that the modulated frequency of the sensor driving signal becomes to be same as a frequency of the data signal, a voltage of the first data signal for displaying a digital image on each pixel of the panel is greater than a voltage of the sensor driving signal during the first predetermined time section within the first scan time section, and a voltage of the second data signal for displaying the digital image on each pixel of the panel is less than the voltage of the sensor driving signal during the second predetermined time section within the second scan time section, and wherein the data driving circuit is further configured to:

supply a data signal having a positive polarity to a first data line and a data signal having a negative polarity to a second data line, and supply the data signal having the positive polarity to a third data line and the data signal having the negative polarity to a fourth data line such that adjacent pixels are driven with different polarities based on an inversion scheme.

2. The apparatus of claim 1, wherein the sensor driving signal and the first data signal are modulated with an identical phase in the first predetermined time section.

3. The apparatus of claim 1, wherein the sensor driving circuit is configured to sense the common electrode in a differential scheme.

4. The apparatus of claim 1, wherein a direction of a liquid crystal, disposed between the display electrode and the common electrode, is controlled in the first predetermined time section.

5. An apparatus for driving a panel comprising a first row of pixels connected to a first gate line, a second row of pixels connected to a second gate line that is different from the first gate line, and a third row of pixels connected to a third gate line that is different from the first and second gate lines, the apparatus comprising:

a gate driving circuit configured to supply a gate-on signal to the first row of pixels via the first gate line during a display data writing period of the first row, thereby turning on switches included in the first row of pixels;

a data driving circuit configured to supply, while the switches included in the first row of pixels are turned on, a data signal to one of the first row of pixels during the display data writing period of the first row, wherein the one of the first row of pixels comprises a display electrode to which the data signal is supplied during the display data writing period of the first row and a common electrode to which a common voltage is supplied during the display data writing period of the first row, and wherein the data driving circuit is configured to form, based on the common voltage supplied to the common electrode and a result of supplying the data signal, a data voltage corresponding to a grayscale value of said one of the first row of pixels between the display electrode and the common electrode; and a sensor driving circuit configured to supply a sensor driving signal to a common electrode of a pixel disposed in the second row during a touch sensing period of the second row and the sensor driving signal to a common electrode of a pixel disposed in the third row during a touch sensing period of the third row, wherein the display data writing period of the first row at least partially overlaps with the touch sensing period of the second row and the touch sensing period of the third row, and the sensor driving signal is a modulated signal, wherein the sensor driving circuit is further configured to select a modulated frequency of the sensor driving signal such that the modulated frequency of the sensor driving signal becomes to be same as a frequency of the data signal, and a phase of the sensor driving signal and a phase of the data signal are the same, and wherein the data driving circuit is further configured to:

supply a data signal having a positive polarity to a first data line and a data signal having a negative polarity to a second data line, and supply the data signal having the positive polarity to a third data line and the data signal having the negative polarity to a fourth data line such that adjacent pixels are driven with different polarities based on an inversion scheme.

6. The apparatus of claim 5, wherein the sensor driving circuit is configured to sense the common electrode of the pixel disposed in the second row in a differential scheme.

7. The apparatus of claim 5, wherein a direction of a liquid crystal, disposed between the display electrode and the common electrode of said one of the first row of pixels, is controlled during the display data writing period of the first row.

8. The apparatus of claim 5, wherein a touch is sensed according to the sensor driving signal in a self-capacitive touch method.

9. The apparatus of claim 5, wherein the sensor driving signal is generated based on a first ground voltage, the data signal is generated based on a second ground voltage, the second ground voltage is generated based on the first ground voltage, and a phase of the second ground voltage is the same as the phase of the sensor driving signal.

10. The apparatus of claim 9, wherein the sensor driving signal is generated by a sensor driving voltage generator, the data signal is generated by a data driving voltage generator, the second ground voltage is generated by a ground voltage generator, the ground voltage generator is configured to operate through a link with the sensor driving voltage generator, and the data driving voltage generator is configured to generate the data signal based on an output of the ground voltage generator.

11. A method for driving a panel comprising a first row of pixels connected to a first gate line, a second row of pixels connected to a second gate line that is different from the first gate line, and a third row of pixels connected to a third gate line that is different from the first and second gate lines, the method comprising:

supplying a gate-on signal to the first row of pixels via the first gate line during a display data writing period of the first row, thereby turning on switches included in the first row of pixels;

supplying, while the switches included in the first row of pixels are turned on, a data signal to one of the first row of pixels during the display data writing period of the first row, wherein said one of the first row of pixels comprises a display electrode to which the data signal is supplied during the display data writing period of the first row and a common electrode to which a common voltage is supplied during the display data writing period of the first row;

forming, based on the common voltage supplied to the common electrode and a result of supplying the data signal, a data voltage corresponding to a grayscale value of said one of the first row of pixels between the display electrode and the common electrode; and supplying a sensor driving signal to a common electrode of a pixel disposed in the second row during a touch sensing period of the second row and a sensor driving signal to a common electrode of a pixel disposed in the third row during a touch sensing period of the third row, wherein the display data writing period of the first row at least partially overlaps with the touch sensing periods of the second row and the third row, and the sensor driving signal is a modulated signal, wherein a modulated frequency of the sensor driving signal is selected such the modulated frequency of the sensor driving signal becomes to be same as a frequency of the data signal, and a phase of the data signal and a phase of the sensor driving signal are the same, and the method further comprising:

supplying a data signal having a positive polarity to a first data line and a data signal having a negative polarity to a second data line, and supplying the data signal having the positive polarity to a third data line and the data signal having the negative polarity to a fourth data line such that adjacent pixels are driven with different polarities based on an inversion scheme.

12. The method of claim 11, wherein a waveform of the data signal and a waveform of the sensor driving signal are the same.

13. The method of claim 12, wherein the waveform is a square wave.

14. The method of claim 11, further comprising:

modulating a ground voltage in accordance with the sensor driving signal.

15. The method of claim 11, further comprising:

sensing the common electrode of the pixel disposed in the second row in a differential scheme.

16. The method of claim 11, wherein the sensor driving signal is generated based on a first ground voltage, the data signal is generated based on a second ground voltage, the second ground voltage is generated based on the first ground voltage, and a phase of the second ground voltage is the same as the phase of the sensor driving signal.

17. The method of claim 16, wherein the sensor driving signal is generated by a sensor driving voltage generator, the data signal is generated by a data driving voltage generator, the second ground voltage is generated by a ground voltage generator, the ground voltage generator is configured to operate through a link with the sensor driving voltage generator, and the data driving voltage generator is configured to generate the data signal based on an output of the ground voltage generator.

* * * * *